March 16, 1948. S. D. ROBINS 2,437,789
AIRCRAFT PROVIDED WITH FIXED AND ROTARY
WINGS FOR CONVERTIBLE TYPES OF FLIGHT
Filed Sept. 28, 1942 16 Sheets-Sheet 1

INVENTOR
SAMUEL DAVIS ROBINS
BY
ATTORNEY

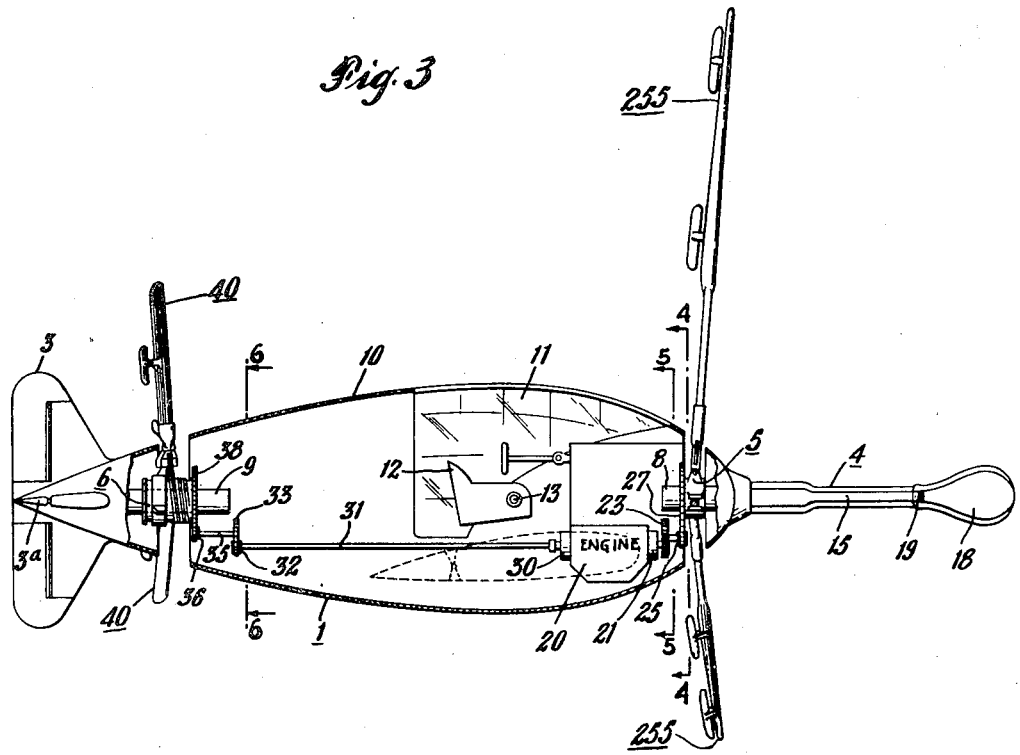

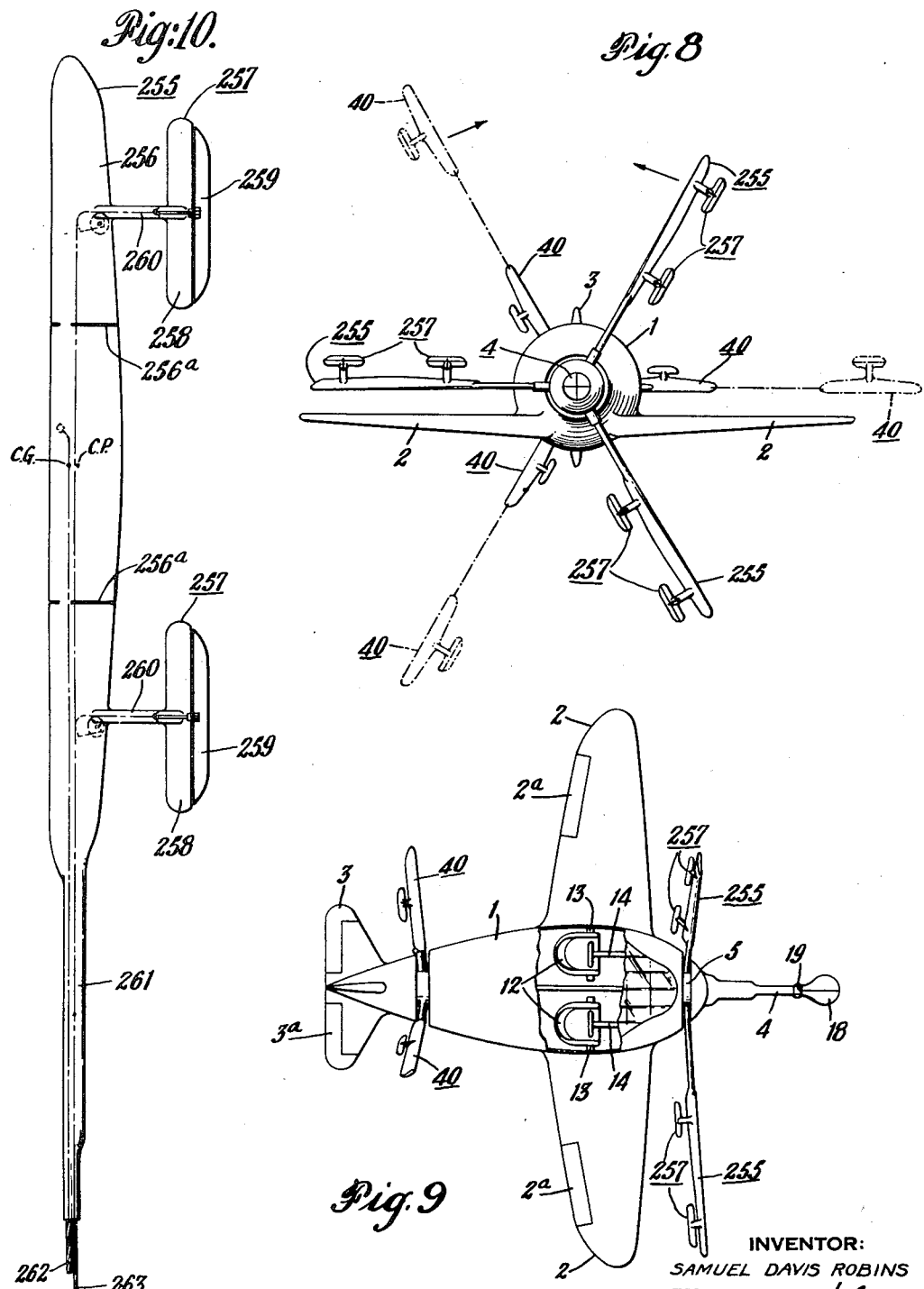

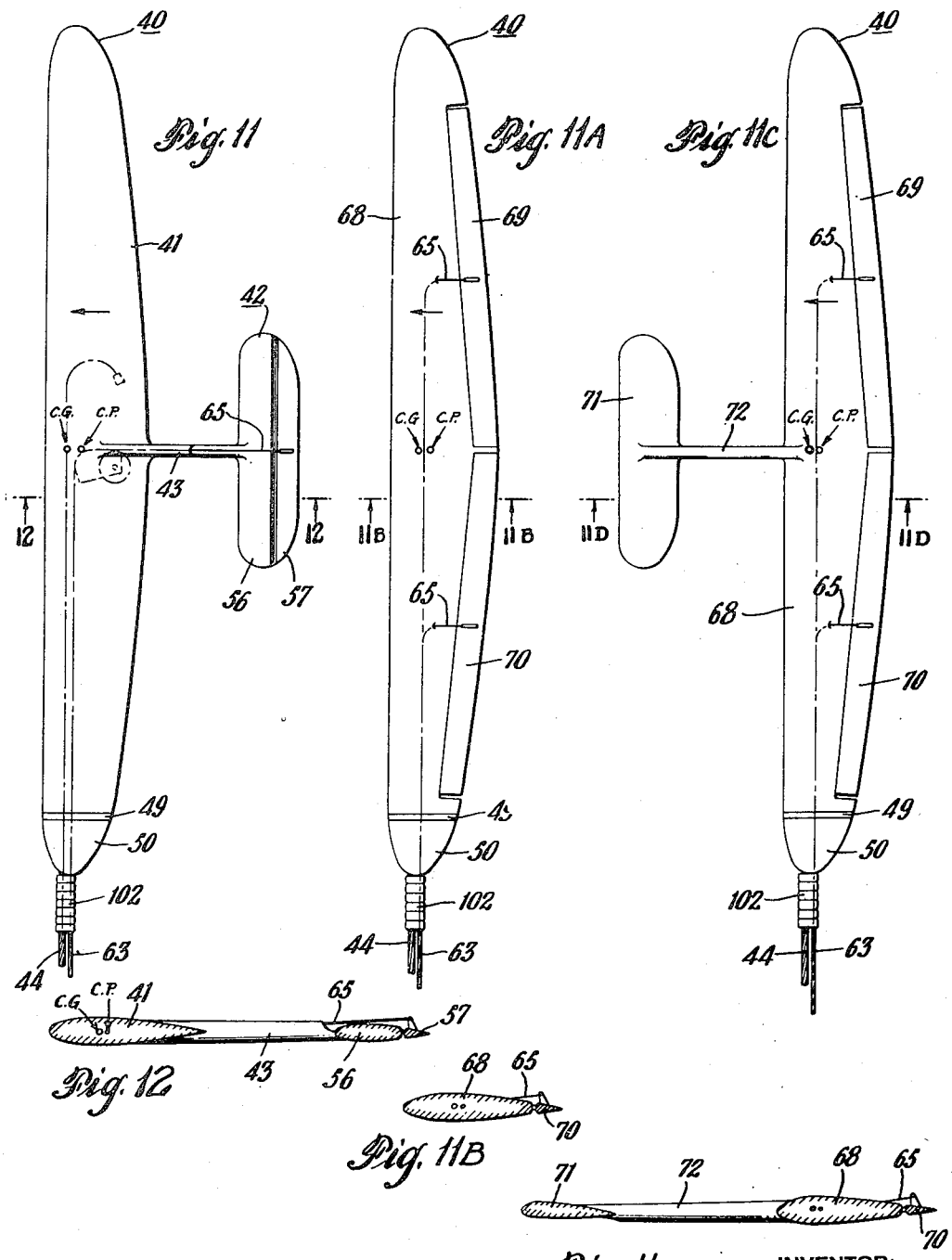

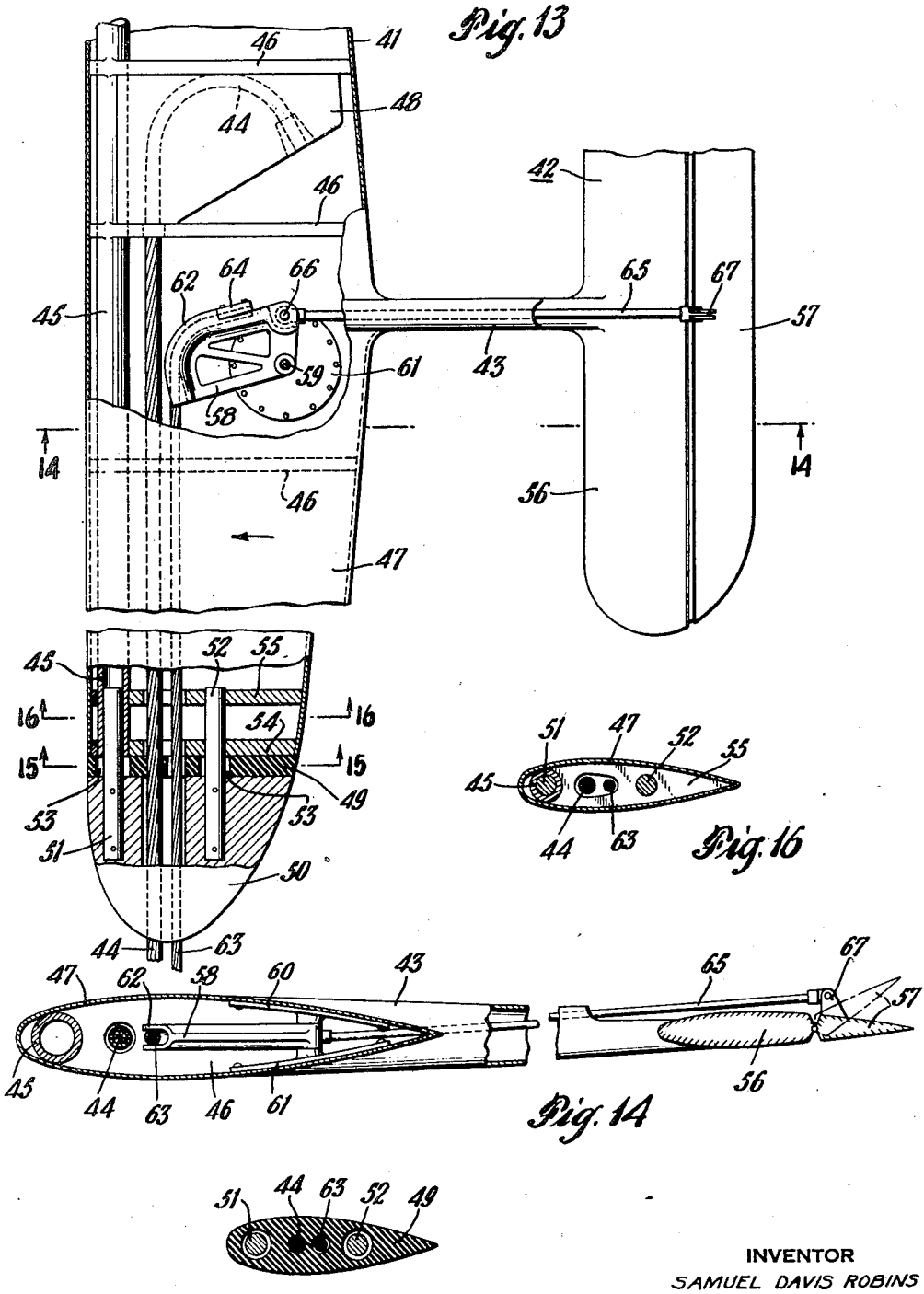

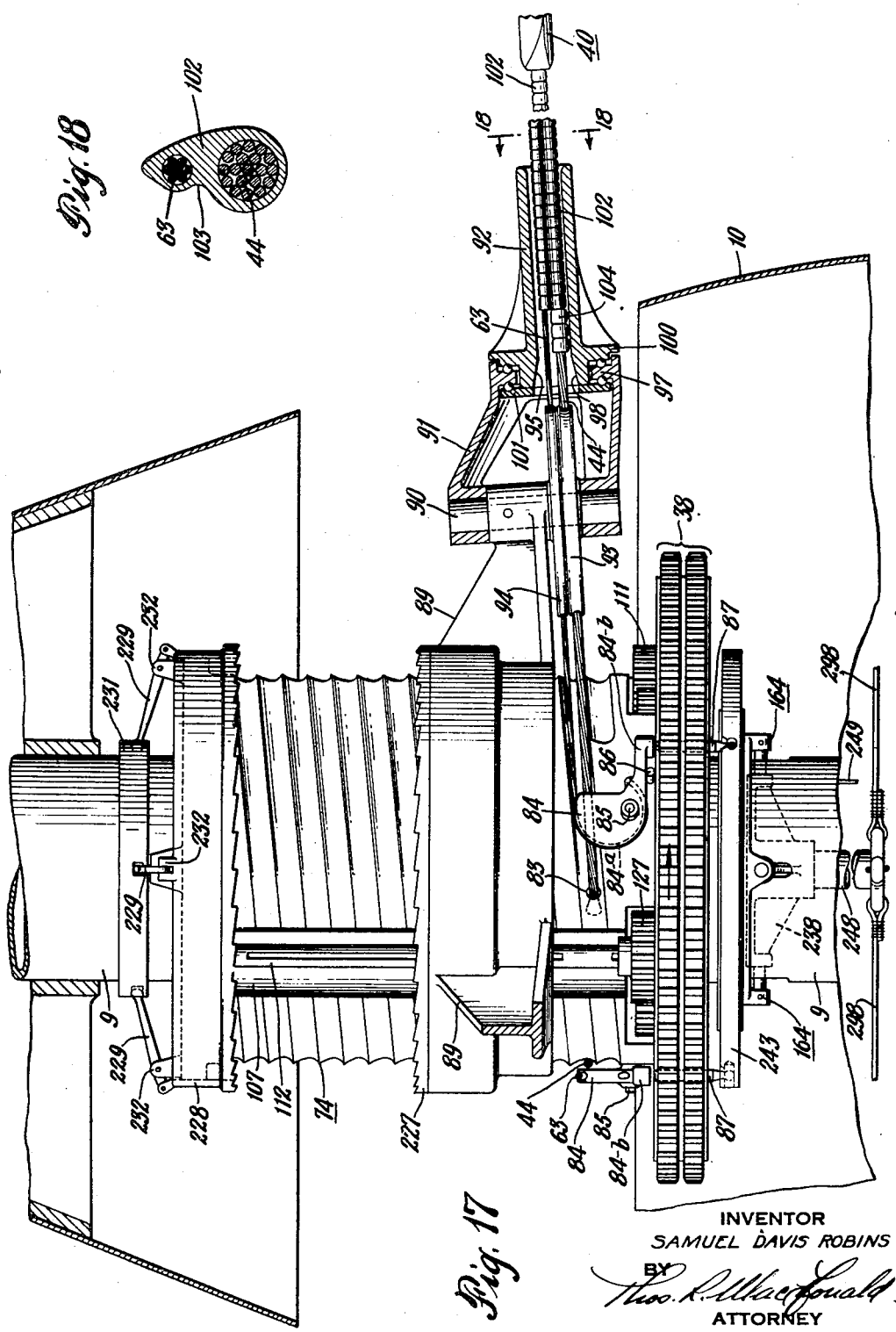

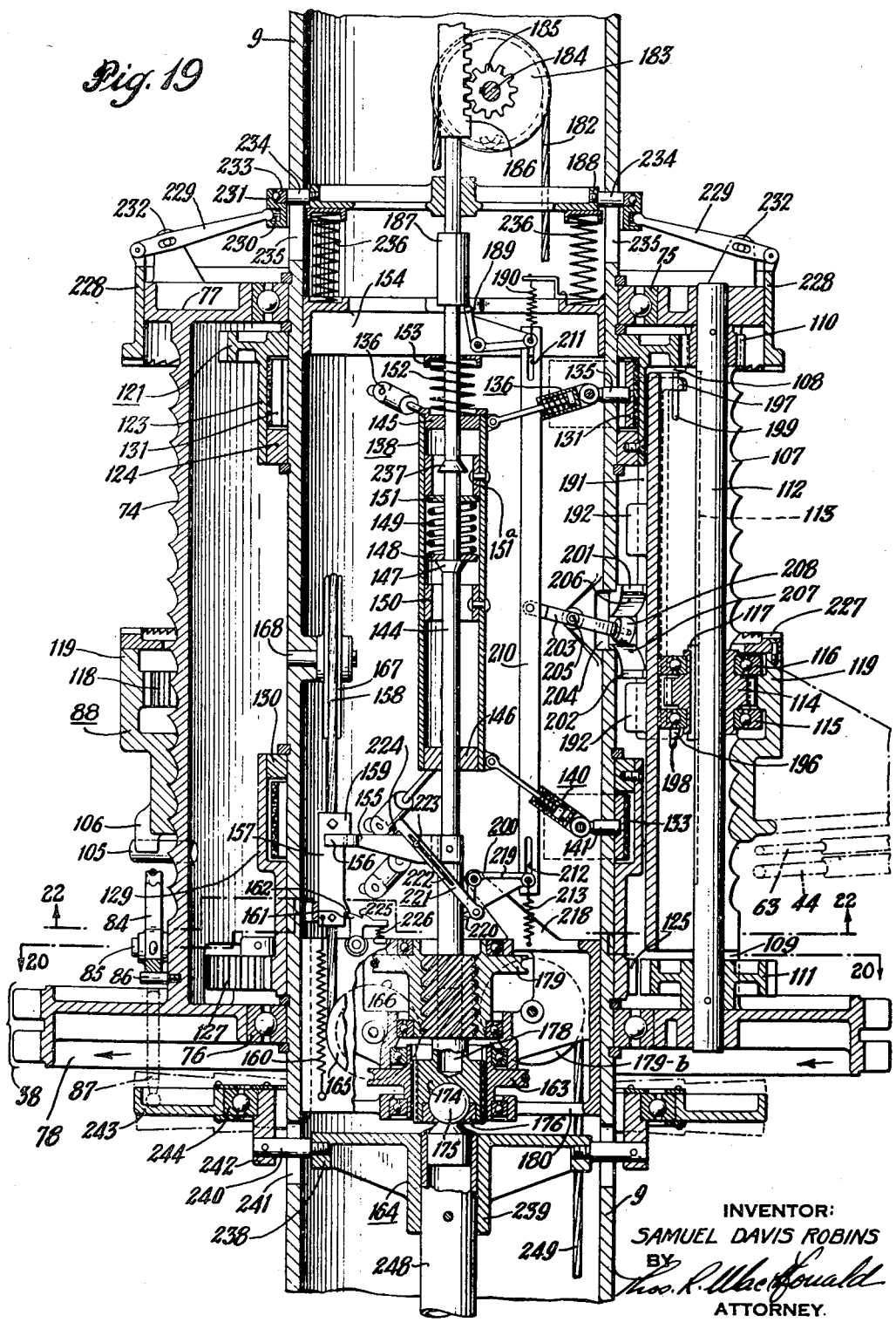

March 16, 1948.   S. D. ROBINS   2,437,789
AIRCRAFT PROVIDED WITH FIXED AND ROTARY
WINGS FOR CONVERTIBLE TYPES OF FLIGHT
Filed Sept. 28, 1942   16 Sheets-Sheet 8

INVENTOR:
SAMUEL DAVIS ROBINS
BY
ATTORNEY.

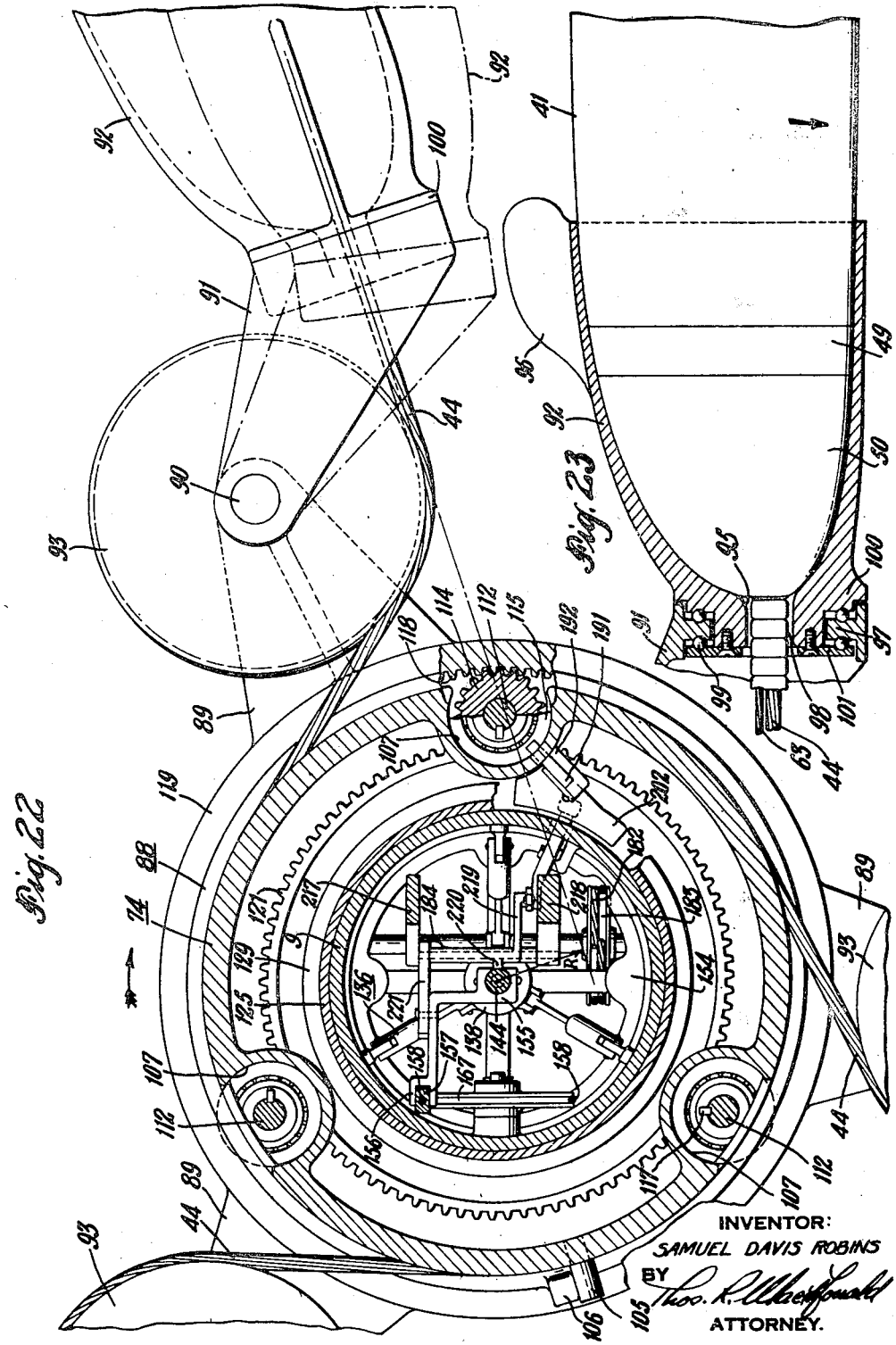

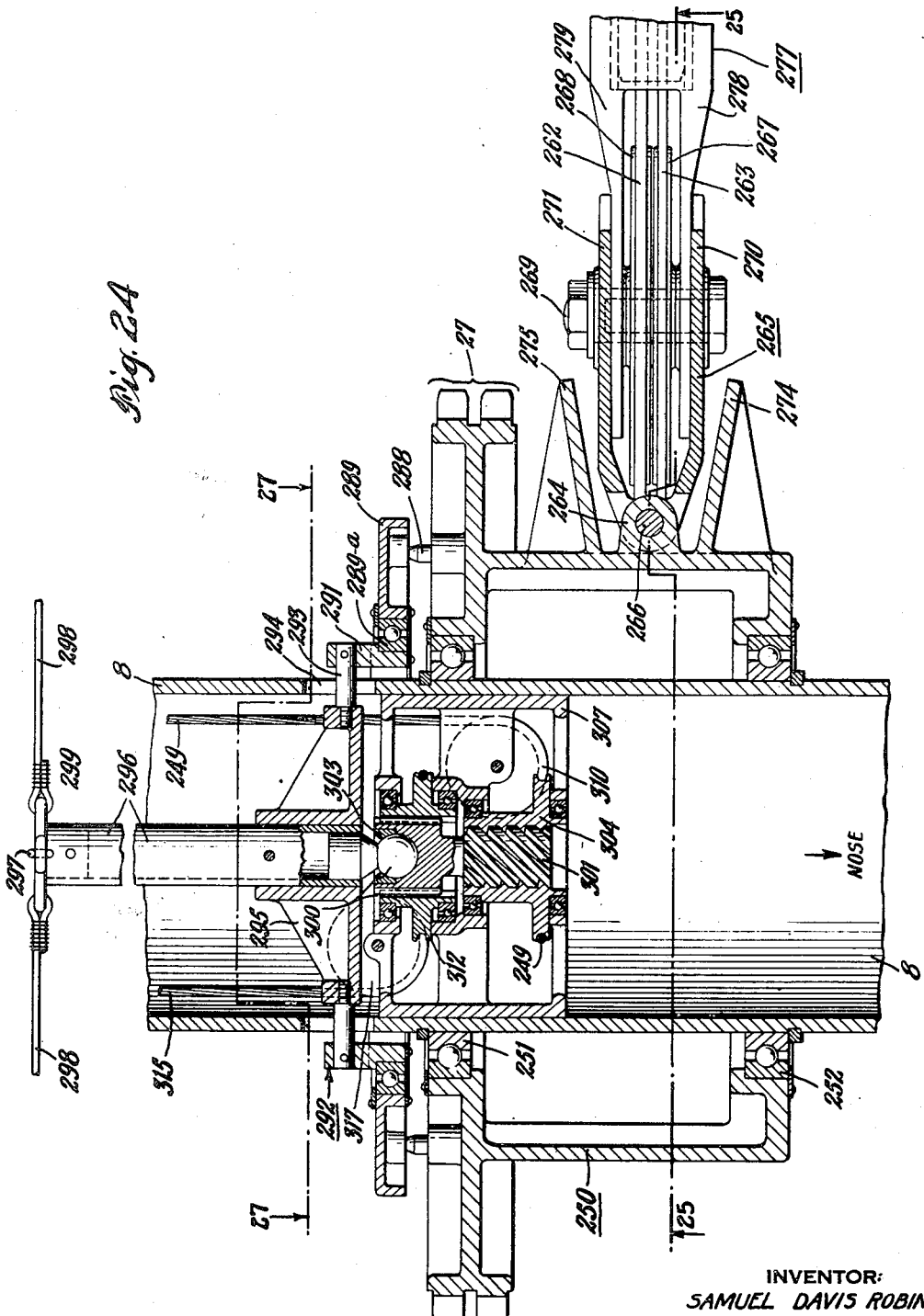

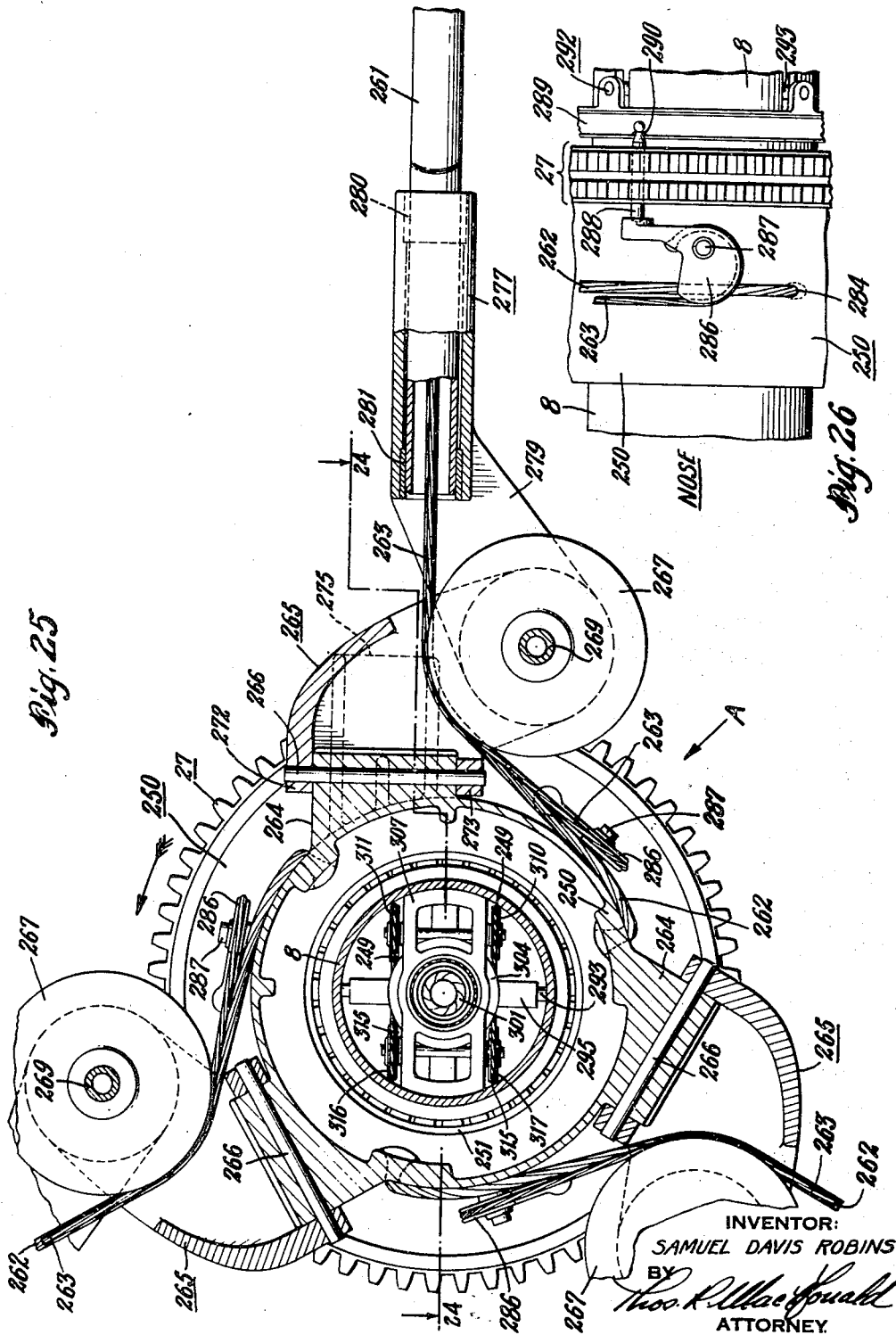

Q = TORQUE
T = THRUST
L = LIFT
D = DRAG
A = ANGLE OF ATTACK
B = BLADE ANGLE
V = INFLOW VEL.
E = ANGLE $TAN^{-1} \frac{D}{L}$
C = ANGLE $TAN^{-1} \frac{V}{2\pi RN}$
W = AIR VELOCITY RELATIVE TO BLADE

INVENTOR
SAMUEL DAVIS ROBINS
BY
ATTORNEY

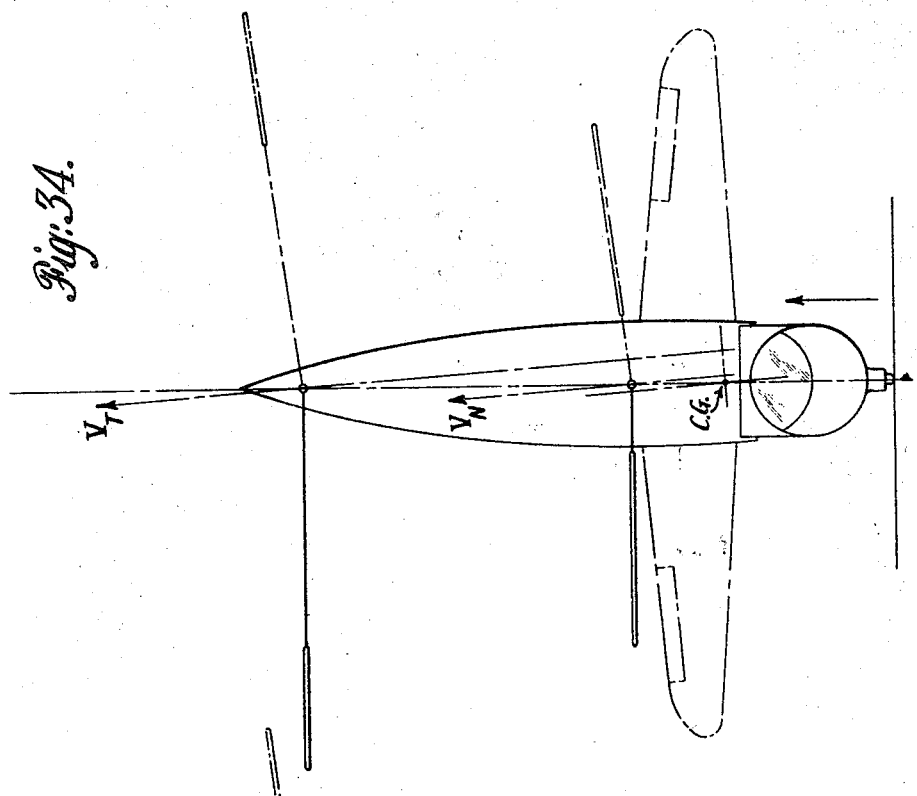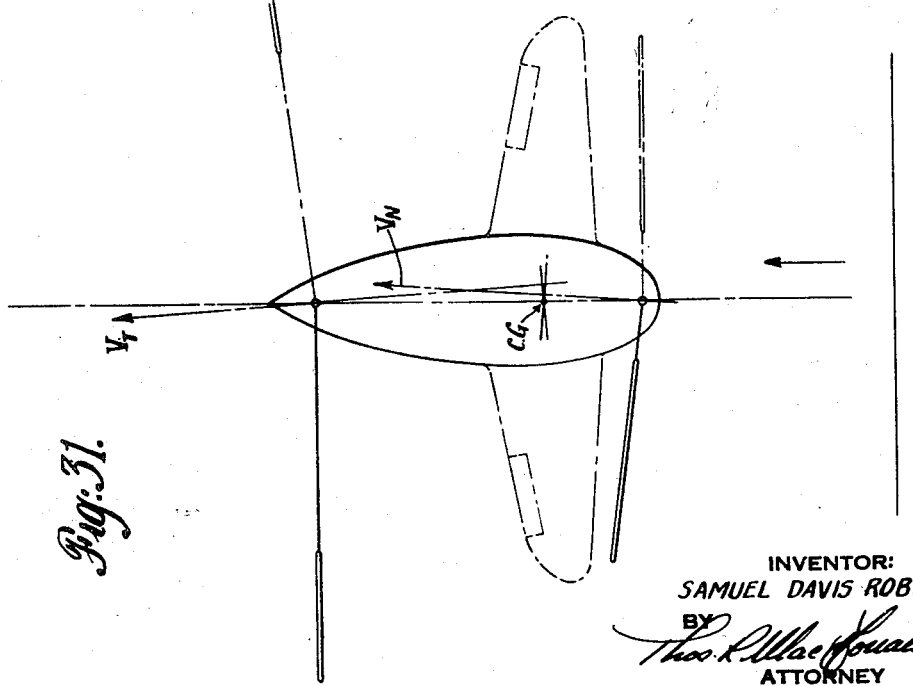

March 16, 1948.                S. D. ROBINS                2,437,789
            AIRCRAFT PROVIDED WITH FIXED AND ROTARY
            WINGS FOR CONVERTIBLE TYPES OF FLIGHT
                    Filed Sept. 28, 1942        16 Sheets-Sheet 16
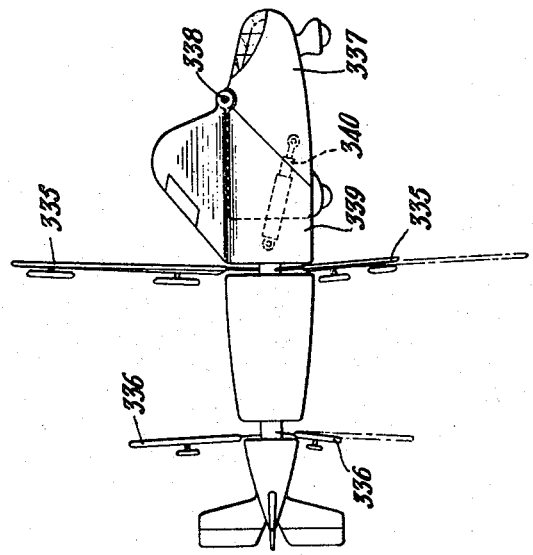
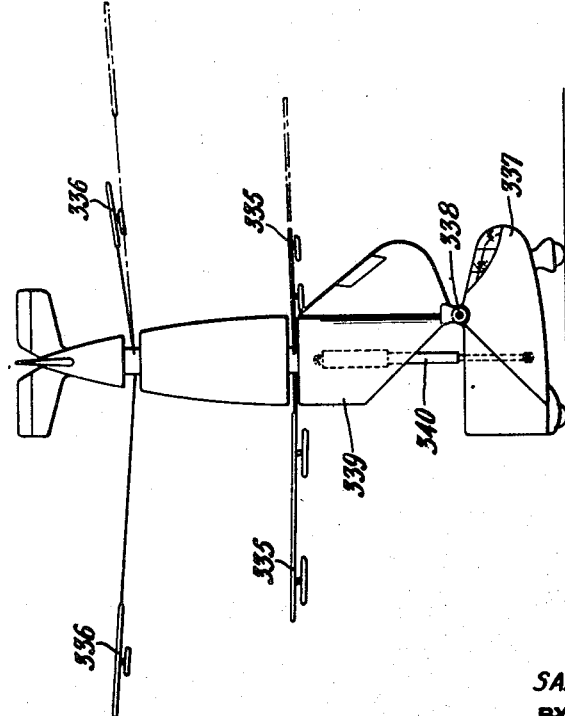
INVENTOR:
SAMUEL DAVIS ROBINS
ATTORNEY Patented Mar. 16, 1948

2,437,789

UNITED STATES PATENT OFFICE 2,437,789

AIRCRAFT PROVIDED WITH FIXED AND ROTARY WINGS FOR CONVERTIBLE TYPES OF FLIGHT

Samuel Davis Robins, New York, N. Y.

Application September 28, 1942, Serial No. 459,897

11 Claims. (Cl. 244—7)

This invention relates to certain new and useful improvements in aircraft and methods of aircraft flight and relates more particularly to improvements in aircraft of the heavier-than-air type and methods of flight therefor.

Objects and advantages of the invention will be set forth in part hereinafter and in part will be obvious herefrom, or may be learned by practice with the invention, the same being realized and attained by means of the steps, instrumentalities and combinations pointed out in the appended claims.

The invention consists in the novel steps, methods, procedures, parts, constructions, arrangements, combinations and improvements herein shown and described.

The accompanying drawings, referred to herein and constituting a part hereof, illustrate apparatus in accordance with the invention for carrying out the method of the invention, and together with the description, serve to explain the principles of the invention.

Of the drawings:

Fig. 3 is a simplified cutaway view in side elevation, with portions of the fuselage framing omitted, of the aircraft of Fig. 1 in airplane flight, tail rotor and a lighting gear retracted, showing a preferred arrangement of the nose and tail rotor and of the rotor propulsive system, of the aircraft;

Figure 1:
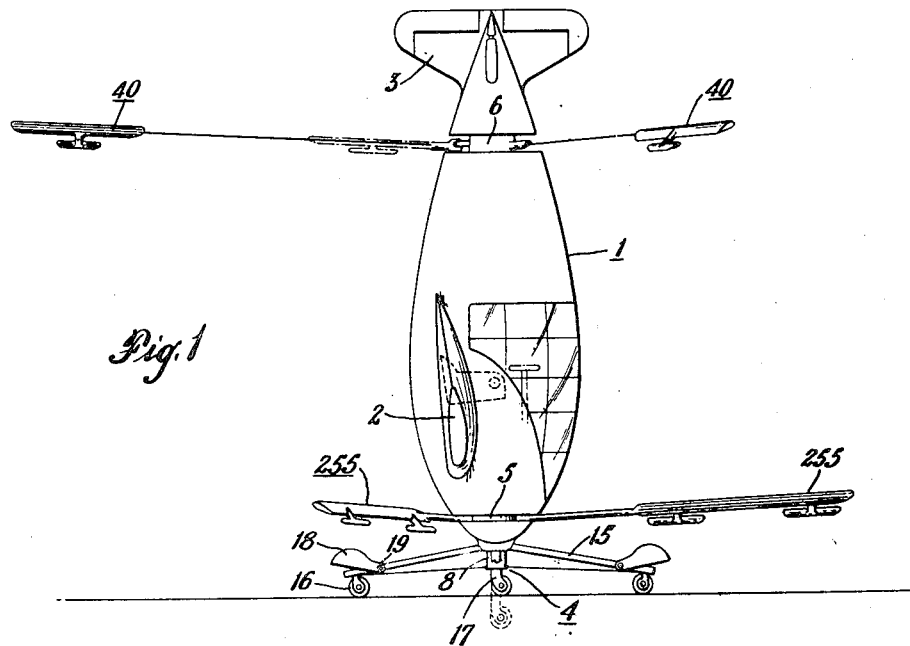
Fig. 1 is a view in side elevation of an aircraft constituting a typical, illustrative and preferred embodiment of the present invention showing the aircraft, tail rotor expanded and nose and tail rotors revolving, in position for and just prior to vertical take-off.
Figure 20:
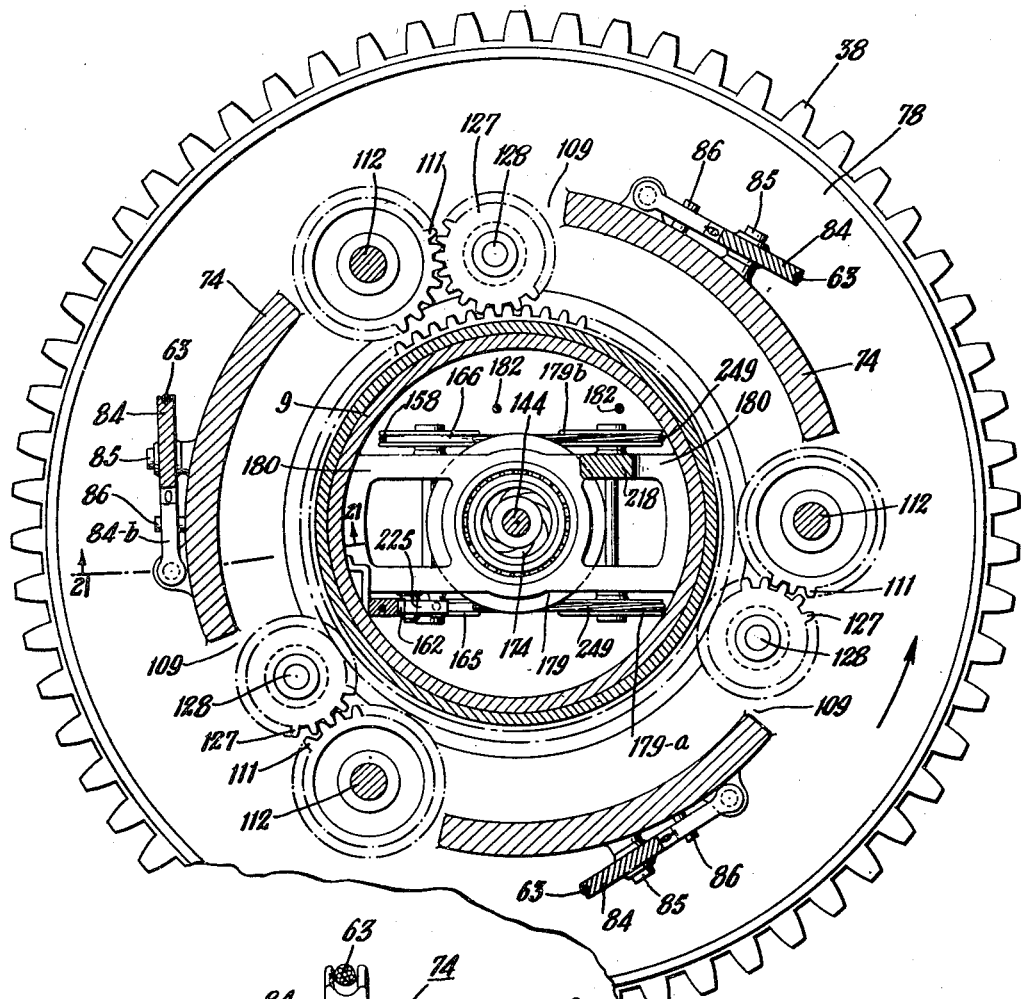
Figure 21:
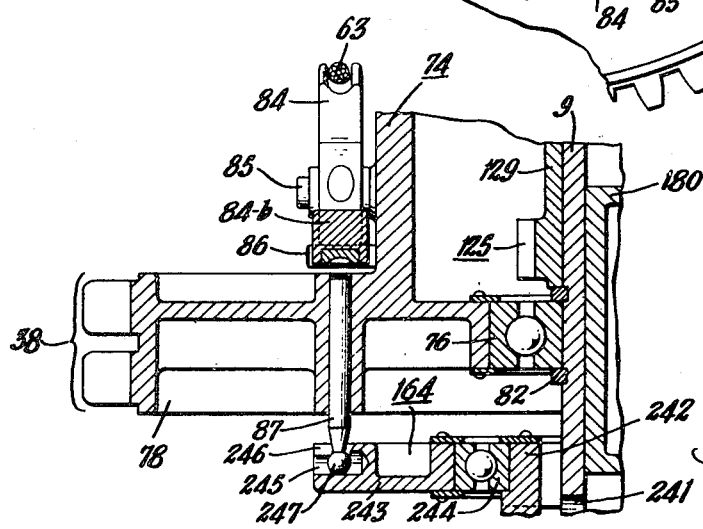
Figure 27:
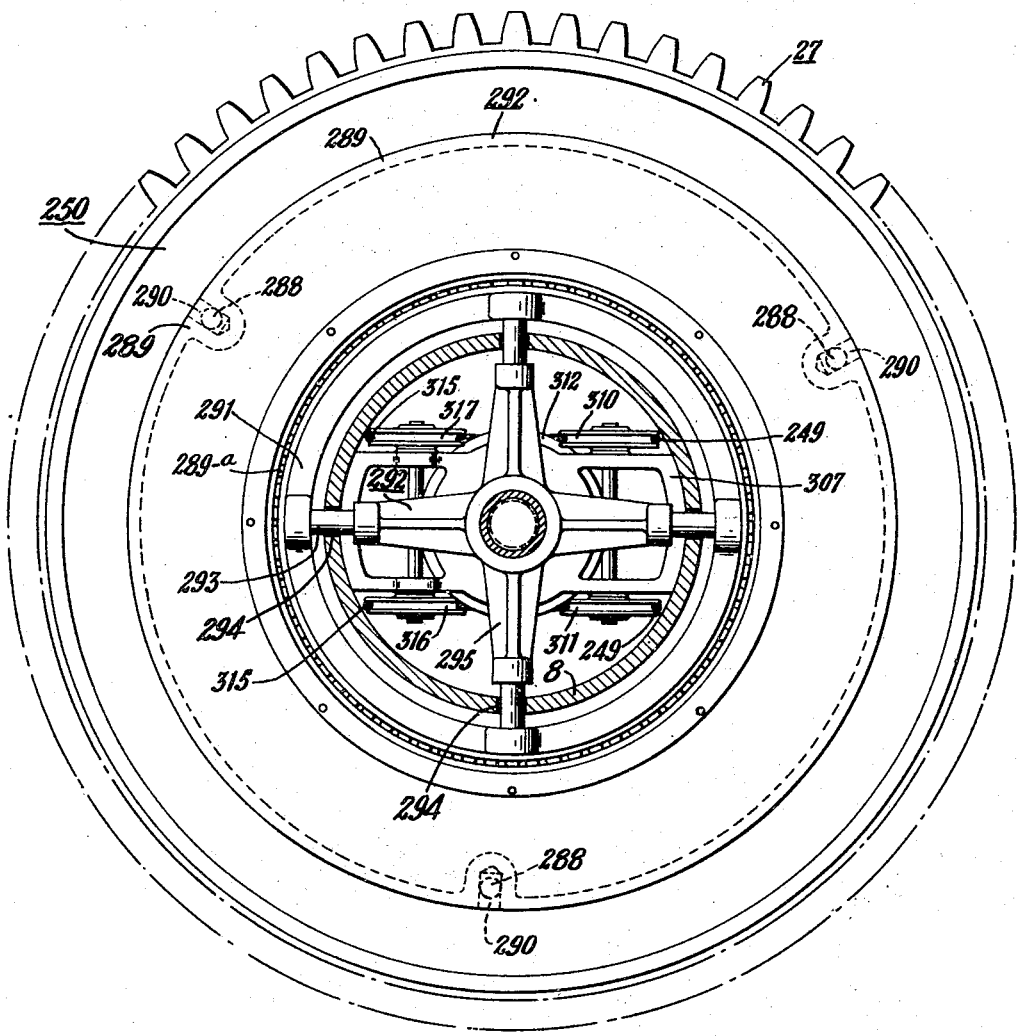
Figure 28:
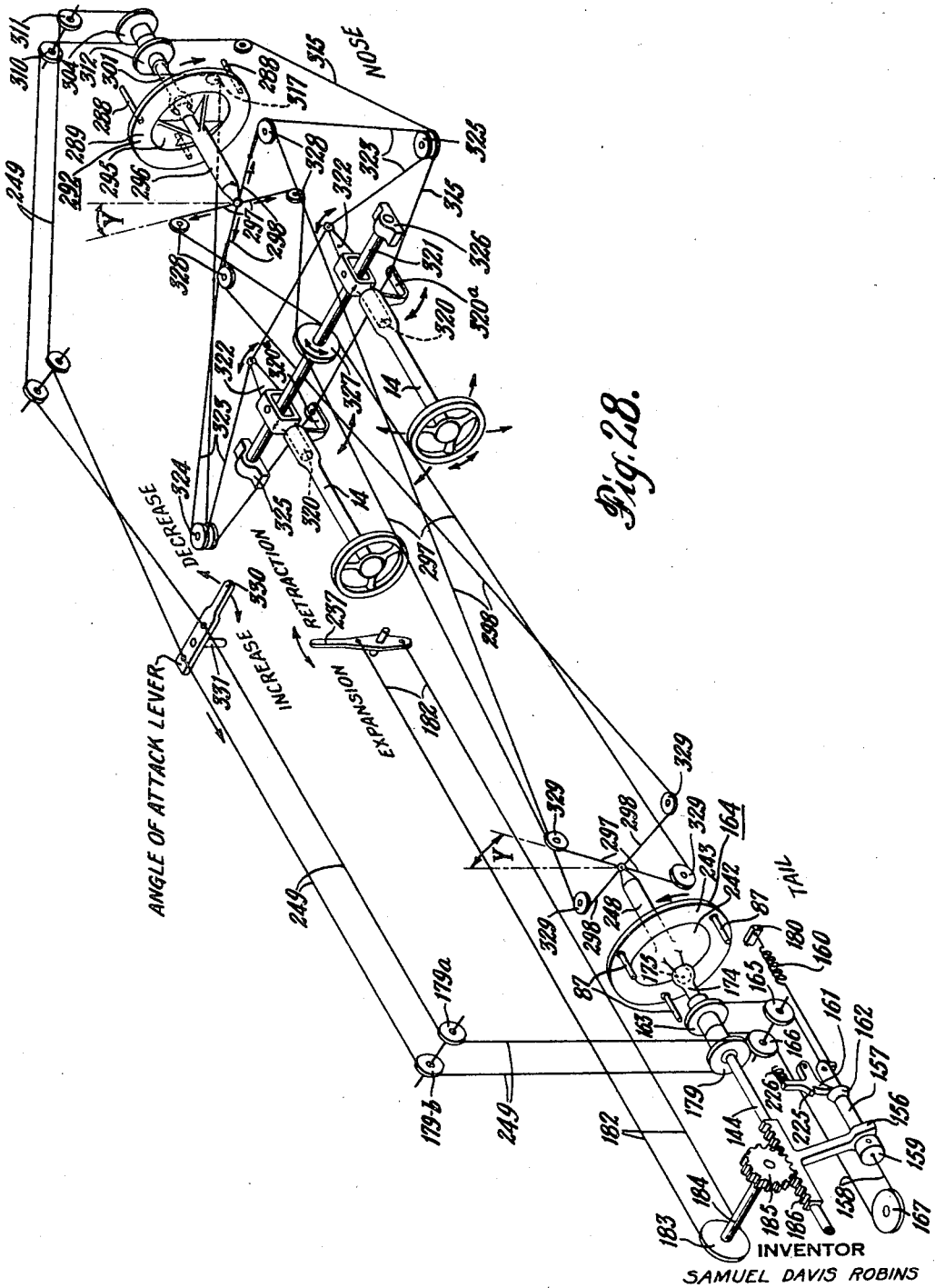
Figure 29:
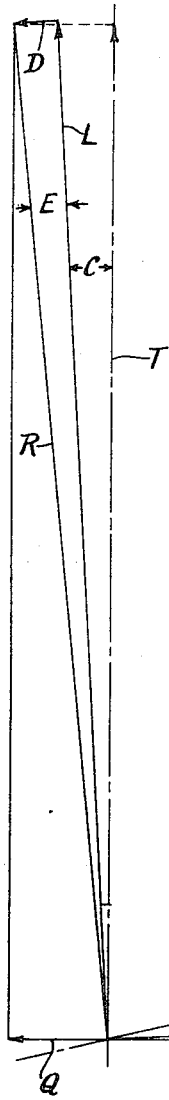
Figure 30:
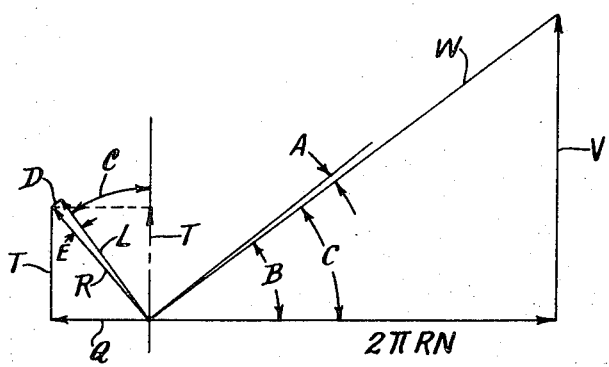

Figs. 4, 5 and 6 are sectional views taken along the lines 4—4, 5—5 and 6—6, respectively, of Fig. 3 showing details of the rotor propulsive system;

Fig. 7 is a view in sectional side elevation, with parts broken away, of a preferred form of fuselage structure for an aircraft such as that of Fig. 1, diagrammatically showing a faired fuselage framework providing a rigid supporting structure upon which the nose and tail rotors of the aircraft are adapted to be revolubly mounted and to which the wings, empennage, alighting gear, etc., are fastened;

Fig. 8 is a view in front elevation of the aircraft of Fig. 1 in airplane flight, tail rotor retracted, the expanded tail rotor being indicated for comparative purposes by the dotted lines;

Fig. 9 is a cutaway plan view, with parts broken away, of the aircraft of Fig. 1 in airplane flight (tail rotor retracted) showing the dual control system;

Fig. 10 is a view of the underside of one of the nose rotor blade assemblies of Fig. 1 as viewed from the ground;

Fig. 11 is a view of the topside of one of the tail rotor blade-assemblies of Fig. 1 viewed from above;

Fig. 12 is a somewhat enlarged view of a section along the line 12—12 of Fig. 11, showing the normally symmetrical airfoil section of the blade and blade elevator;

Figs. 11A and 11C are views of the topside of modified forms of tail rotor blade-assemblies as they would appear in helicopter flight when viewed from above;

Figs. 11B and 11D are somewhat enlarged views of sections taken along the lines 11B—11B and 11D—11D, respectively, of Figs. 11A and 11C, respectively;

Fig. 13 is an enlarged fragmentary view in plan, with parts broken away and parts in section, of the topside of the tail rotor blade-assembly of Fig. 11, showing details of the main blade, the blade elevator and of the blade elevator operating mechanism;

Figs. 14, 15 and 16 are views in section taken along the lines 14—14, 15—15 and 16—16, respectively of Fig. 13;

Fig. 17 is an enlarged cutaway, fragmentary view in elevation, with parts in section, of a portion of the aircraft of Fig. 1 showing a perferred form of tail rotor hub, hub journal and feathering blade scabbard, depicting the arrangement of the parts at the start of retraction;

Fig. 18 is a view in section along the line 18—18 of Fig. 17 showing the manner in which the cables connecting each blade assembly to its hub, are faired;

Fig. 19 is a view in section along a series of parallel vertical longitudinal planes of the aircraft of Fig. 1, showing details of the tail rotor hub and of the tail rotor retracting and expanding mechanism, the figure depicting the arrangement of parts at the start of retraction;

Fig. 20 is a view in section taken along the line 20—20 of Fig. 19;

Fig. 21 is a somewhat enlarged fragmentary sectional view taken along the line 21—21 of Fig. 20 showing details of the blade elevator controlling mechanism;

Fig. 22 is a view in section taken along the line 22—22 of Fig. 20, the position of a blade scabbard with tail rotor retracted being indicated by broken lines;

Fig. 23 is a view in section taken along the central longitudinal plane of one of the feathering tail rotor blade scabbards with a tail rotor blade sheathed therein;

Fig. 24 is a view in vertical section through the nose rotor of the aircraft of Fig. 1, taken along the line 24—24 of Fig. 25 and depicting a preferred form of nose rotor hub, hub journal and mechanism for transmitting movement of the pilot's control column to the blade elevators;

Fig. 25 is a view in section taken along the line 25—25 of Fig. 24;

Fig. 26 is a view of a detail of the nose rotor hub, looking in the direction of the arrow A in Fig. 5 particularly showing a sheave crank for transmitting movements of the pilot's control stick to the blade elevators;

Fig. 27 is a view in section taken along the line 27—27 of Fig. 24;

Fig. 28 is a schematic view of certain details of the control system for the nose and tail rotors of the aircraft of Fig. 1;

Figs. 29 and 30 are vector diagrams depicting in conventional propeller diagram fashion forces, angles and velocities; Fig. 29 showing a relationship of values typical of the combined rotors of the aircraft of this invention in helicopter flight, tail rotor expanded, whereas, Fig. 30 shows the relationship of these values for the same aircraft in airplane flight; tail rotor retracted;

Fig. 31 is a vector diagram depicting typical directive forces acting upon an aircraft such as that of Fig. 1 in helicopter flight, responsive to a given tilting of the control column by the pilot, the center of gravity lying between the rotors in both airplane and helicopter flight;

Fig. 32 is a view of a modified embodiment of this invention suitable for aircraft requiring maintenance of a cargo or passenger carrying compartment in a horizontal attitude, showing the aircraft in helicopter attitude just prior to vertical take-off; the center of gravity of the aircraft shown lying in advance of the rotors both in airplane flight and helicopter flight;

Fig. 33 is a view of the aircraft of Fig. 32 showing the aircraft in airplane flight; and Fig. 34 is a vector diagram depicting typical directive forces acting upon an aircraft such as that of Fig. 32 in helicopter flight in response to a given tilting of the control column by the pilot.

Among aircraft of the heavier-than-air type, of which the conventional fixed wing airplane, and rotary wing aircraft such as the helicopter, and the autogyro, are the best known examples, the fixed wing airplane, despite its inherent capacity for stalling, possesses certain desirable features in the way of speed, stability, flight range, economy, simplicity of construction and initial cost which have made it preferable to the autogyro as a commercial aircraft notwithstanding the desirable inherent non-stalling characteristic and vertical take-off and landing capacity of the latter. A more extensive commercial development of the autogyro is, moreover, a doubtful possibility, since the L/D ratio of the autogyro rotor has yet to exceed half that of modern fixed wings.

The true helicopter by generally accepted definition is a rotary wing aircraft which uses all of its power (except for a small amount used for control purposes in some types) in its lifting rotor system for the production of lift. Like the autogyro, it possesses a desirable inherent non-stalling characteristic which the fixed wing airplane lacks.

An object of this invention therefore is to provide an aircraft in which is combined the high speed and cruising speed performance, flight range, stability and economy characteristics, simplicity of construction and low initial cost of the conventional fixed wing airplane with the desirable non-stalling characteristic and vertical take-off and landing capacity of the helicopter and the autogyro.

In the conventional airplane, stability has little to do with the attitude of the airplane with respect to the ground and is concerned mainly with the maintenance of a stable, i. e., non-stalling, angle of attack. Thus, because of the airplane's inherent capacity for stalling, its definition of required aerodynamic stability may be said to be "that property of automatic adjustment to air disturbances which prevents stall."

In the helicopter, on the contrary, because of its inherent non-stalling character, the definition of required aerodynamic stability is rather "that property which automatically causes the helicopter to maintain an upright attitude in spite of air disturbances of any kind."

There is reason to believe that no full sized helicopter which has yet been flown has possessed satisfactory aerodynamic stability. Successful flights have been made it is true, but the desired upright attitude has been maintained apparently only through the provision and use of all necessary controls. Visual analyses of the flight characteristics of such aircraft indicate that they possess a very definite instability as far as their inherent aerodynamic reactions to gusts may be observed.

A further impetus would obviously be given to the development of the helicopter if this inherent aerodynamic instability could be eliminated; and, it is another object of this invention to provide an aircraft capable of helicopter flight which will possess inherent aerodynamic stability in helicopter flight.

It is another of the objects of this invention to provide an aircraft capable of both helicopter flight and high speed airplane flight which will possess inherent aerodynamic stability in both flight conditions.

It is believed that the only true helicopters to date which have made prolonged flight, obtained forward propulsion, i. e., horizontal flight, by tilting of the machine as a whole, thereby introducing a forward component of the rotor system lift vector.

A number of the rotary wing aircraft of the prior art come under the helicopter definition in so far as power application to the lifting rotor system is concerned. These devices are supposed to take-off and land vertically by means of the rotor system, but in horizontal flight use the rotor system for propulsive purposes being then sustained on conventional fixed air-foils or wings. These combination airplane-helicopters which are to be distinguished from the so-called true helicopters may be grouped in two classifications:

Those which tilt or swing the lifting rotor system about ninety (90) degrees with respect to the fuselage at some altitude where "conversion" from vertical ascent to horizontal flight is considered possible and safe; and Those which maintain a constant relationship between the rotor-system, wings and fuselage, but, when "converting," swing or change the entire attitude of the machine through some large angle approaching ninety (90) degrees. This latter form generally employs trunnion seats for the pilot and passengers.

In the "tilting" or "swinging" rotor type, the maneuver of "conversion" presents serious difficulties even assuming that the mechanical problem of conversion has a simple solution. A progressive study of the steps during the conversion in flight reveals that during the conversion interval, however short, the machine is as much out of control as the conventional airplane in a whipstall since there is no forward velocity for obtainment of a sustaining effect from the fixed wings. Moreover, the rotor is momentarily subjected to a very high translational velocity.

In the "attitude-conversion" type, wherein the machine having climbed vertically noses over rapidly and dives to obtain sufficient velocity for horizontal flight, again it is evident that during the nosing-over operation there not only can be no control until a very high axial flow has been obtained, but again the angle of attack must swing rapidly through a very large angle as in the whipstall (approximately 180 degrees). This maneuver while possible, is violent to say the least, and involves a prolonged interval during which there is no control.

It is therefore obviously desirable to effect a transition of the flight of an aircraft from a condition of helicopter flight to a condition of airplane flight or vice-versa without loss of control of the aircraft, and with the imposition of a minimum of discomfort upon its occupants and so as to avoid imposition of undue stress upon its structural members and it is a further object of this invention to provide an aircraft capable of effecting such a transition and to provide a novel method of flight by which such transition may be effected with the said aircraft.

A high velocity air flow across the rotor disc is undesirable. This condition, which is characteristic of the helicopter and the autogyro, is objectionable because it imposes high differential velocities upon the rotor blades in their cycle of revolution. Both the "tilting" rotor type and the "attitude-conversion" type of helicopter previously referred to, seek to avoid this condition, but as has been pointed out, in doing so they are confronted with the problems incident to loss of control and violent maneuver.

This art attests the amount of ingenuity and effort which has been expanded in attempts to meet and overcome the vast sequence of complications, both aerodynamic and mechanical, arising from this condition. Problems of blade resonance and dynamic balance due to the irregularities which these excessive velocity differentials impose have confronted workers seeking in the two main schools of thought, "feathering" and "flapping," the best means of blade accommodation.

It is therefore another object of this invention to provide an aircraft capable of both helicopter flight and high speed airplane flight as to which the airstream will flow at all times substantially axially of the rotor system and of the aircraft and which will be substantially free of factors of blade resonance and dynamic unbalance encountered in the usual rotary wing aircraft.

Another object of this invention is to provide an aircraft having a rotor wherein control of the rotor blade thrust or lift force, as the case may be, is effected by aerodynamic control of the *blade angle of attack* rather than by mechanical control of the *blade angle*.

Another object of this invention is to provide an aircraft having a rotor so constructed as to effect a very great saving in weight.

Another object of this invention is to provide a novel combination airplane-helicopter aircraft.

Another object of this invention is to provide an aircraft capable of both airplane and helicopter flight which will have high rotor efficiency in both flight conditions.

Another object of this invention is to provide a novel method of flight for heavier-than-air aircraft.

Another object of this invention is to provide a novel screw propulsion device particularly for aircraft.

Another object of this invention is to provide a propeller driven aircraft which for a given power loading (pounds per horsepower) has a higher speed range than known aircraft having an equal power loading.

Another object of this invention is to provide a propeller driven aircraft capable of both helicopter flight and high speed airplane flight in which the propeller system is capable of usefully absorbing the full horsepower of the engine in helicopter flight and again when adapted to airplane flight, without change of propeller speed, the propeller torque being balanced in both flight conditions.

In general, the foregoing objects and advantages are attained in accordance with this invention through the provision of a propeller driven aircraft having a novel free bladed constant speed differential diameter rotor system which is capable in the helicopter flight condition of alone supplying the necessary lift, yet in the airplane, or high speed flight condition of functioning efficiently as a propeller to produce the requisite thrust—the lift then being supplied by a small fixed wing of conventional design.

In order that the rotor system may accomplish this dual function, it is so constructed and arranged that its "swept disc area" may be varied in flight by suitable pilot operated means actuable to increase or decrease the swept disc area at will by rotor expansion or retraction.

The rotor system may comprise one or more pairs of rotors, the rotors of each pair being of unequal diameter, that is, of "differential diameter," and arranged in coaxial, counter-rotating torque balancing relationship, at least one rotor of the pair being retractable and expandable so as to vary the swept disc area of the pair.

By retractable and expandable is meant the capacity to vary the rotor diameter at will so as to decrease or increase the mean operating radius of the aerodynamic lift producing surface of each rotor blade.

The rotor blades, respectively, comprise an aerodynamically stable lift-producing structure, that is, a structure which will meet the air at a stable (constant) angle-of-attack, which is flown around its rotor axis by a highly flexible, relatively light weight cable functioning to restrict the structure to a circular path of movement but not otherwise limiting the freedom of movement of the surface as it rotates. Each blade is thus arranged to meet the air at a stable (constant) angle-of-attack.

Through the provision of unequal diameter rotors, the slip stream from the larger rotor surrounds, but does not interfere with the slip stream from the smaller rotor. In consequence, the smaller rotor may operate at the same blade angle as the larger rotor.

In helicopter flight, the inflow to each rotor of the pair is of the same velocity, the mean blade velocity of each rotor of the pair is the same and hence the V/ND of each rotor is the same.

In order to obtain the same mean blade velocity, the larger rotor is caused to rotate at a slower speed than the smaller rotor. This is a material advantage, since the variation in blade velocity diametrically of the swept disc area is smaller than would be the case, for example, with a single rotor having the same mean blade velocity for blades extending within the same inboard and outboard limits so as to have the same swept disc area. It is of course desirable to have the blade velocity as nearly constant as possible throughout its extent.

Means are provided for aerodynamically controlling the stable angle of attack at which the lift-producing structures meet the air. This in conjunction with the ability to vary the swept disc area of the rotor system permits the system to be operated at a substantially constant rotational speed, that is, R. P. M., and at the same time usefully absorb the full horsepower of the engine regardless of whether the disc area is at maximum or minimum value.

As is well known in the art, the requirement for helicopter flight is high thrust per horsepower with low velocity air, that is, low inflow velocity. This requires a large swept disc area.

In relation to the required disc area for helicopter flight, the optimum disc area of the propeller of an airplane of a corresponding weight and power would be small. In general, the propeller diameter is that at which for L/D max. the blades will absorb all of the horsepower.

It is therefore apparent that the two flight conditions require two separate disc areas; one (large) for helicopter flight and one (small) for airplane flight, the relative areas being, for purposes of example, as 256 is to 144.

In the former case, where the direct support of the aircraft as a helicopter depends upon very high rotor thrust under relatively static conditions, the criterion of efficiency is measured in pounds thrust produced per horsepower. This is not using the term efficiency in its usual sense in mechanics, i. e., power output divided by power input.

In the latter case, where the motor function becomes the conventional propeller function, the efficiency is conventionally expressed as power output divided by power input, or, thrust horsepower divided by shaft horsepower.

Stability in helicopter flight is obtained with the present invention through the provision of "free bladed" rotors and the judicious determination of their respective sizes and locations with respect to the center-of-gravity of the aircraft as will be explained more fully hereinafter.

In military pursuit planes of very low power loading, propeller thrust may approximate the gross weight of the aircraft, but in transport planes, or light sport planes, of relatively high power loading (lbs. per H. P.) the propeller thrust is apt not to exceed ⅛ weight.

As this invention contemplates universal application throughout the practical range of power loading, it is clear that the case of the aircraft of high power loading is the most difficult of solution as it calls upon the rotor system to function efficiently under conditions of the widest difference, to wit, to supply as a helicopter a thrust some eight times that required when functioning as an airplane propeller.

It will be understood that the foregoing general description and the following detailed description as well are exemplary and explanatory but are not restrictive of the invention.

To these ends and as at present preferably embodied, there is shown in Fig. 1 an aircraft constructed in accordance with this invention which as here embodied comprises a fuselage 1 provided with wings 2, empennage 3, landing gear 4 and a propelling and/or sustaining rotor system formed by a power driven nose rotor 5 and a power driven retractable tail rotor 6, preferably of larger tip diameter than the nose rotor.

Figure 2:
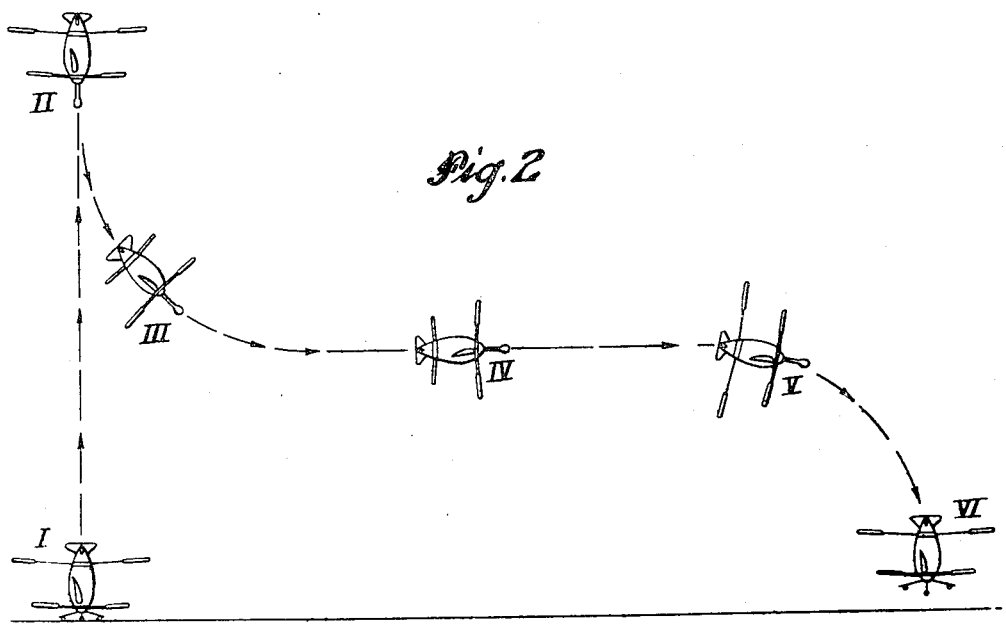
Fig. 2 is a view depicting the attitudes and flight path of an aircraft such as that of Fig. 1 in the performance of the cycle of operations characterized by helicopter take-off, airplane flight and helicopter landing in the order named.

As will be evident from the diagrammatic showing of Fig. 2, the aircraft in being launched from a position of rest in a nose-down attitude upon a supporting surface, as at I in Fig. 2, is accelerated by means of the motor system, the tail rotor being expanded, to a state of motion in which the aircraft moves upward tail-first, in which condition the inflow of air to the rotors is axial from tail to nose to a desired altitude, as at II in Fig. 2, and is then decelerated by the rotor system and/or gravity to a state of rest. The landing gear is preferably retracted during this interval and tail rotor retraction initiated. The aircraft is then accelerated by means of gravity to a state of motion in which the aircraft moves downward nose first, in which condition the inflow of air to the rotors is axial from nose to tail, as at III, Fig. 2, until it has reached a velocity at which the fixed wings are capable of sustaining the aircraft in a substantially horizontal attitude, retraction of the tail rotor being completed during this interval. The aircraft is then guided from the flight path along which it is descending to a flight path, along which the aircraft proceeds, as at IV, Fig. 2, in a substantially horizontal attitude at a velocity at which the aircraft is sustained by the fixed wings.

Landing of the aircraft is accomplished preferably by expanding the tail rotor and then guiding the aircraft downwardly nose-first as at V, Fig. 2, from the flight path along which it is proceeding to a flight path along which the aircraft descends in a substantially vertical attitude as at VI, Fig. 2, at a reduced velocity at which it is sustained by the rotor system until it reaches an altitude proximate to the supporting surface. The aircraft is then rapidly decelerated by means of the rotor system over the remaining distance to a state of rest in a nose-down attitude upon the supporting surface.

The wings 2 have the primary function of sustaining the aircraft in airplane flight. The wing area, in consequence, may be considerably less than in conventional fixed wing airplanes since they are not required to develop lift during take-off and landing of the aircraft, that function being taken over by the rotor system. A considerable saving in weight and in total drag is thus made possible. As here embodied, the wings 2 are of cantilever construction and are preferably provided with the usual ailerons 2a which may be connected by cables or other means (not shown) to pilot operated means, such as the control columns 14, to be described hereinafter, by which lateral control of the aircraft in airplane flight may be effected in the usual fashion.

The empennage 3, provided with the usual fixed and movable directional control surfaces 3a, is primarily intended to provide directional control supplementary to that furnished by the nose rotor 5 particularly in airplane flight, it being understood that directional control of the aircraft both in airplane and helicopter flight is primarily intended to be accomplished by tilting of the coning axes of the rotors 5 and/or 6, as will be described more fully hereinafter. The empennage control surfaces, like the wing ailerons, may be wholly dispensed with in the event that the rotor system is designed to provide the necessary yawing, pitching and rolling moments of required magnitude and direction. Such a construction is wholly within the contemplation of this invention.

The fuselage 1, as embodied, forms a stressed structure upon which each rotor is journalled. It also performs the more usual function of providing support for the wings, empennage and landing gear.

As here embodied, and as is digrammatically shown in Fig. 7, the fuselage 1 comprises a number of longitudinally-extending circumferentially-spaced members 7 of suitable latticed girder construction which are joined to each other at their ends and provide a rigid framework supporting in axial alignment a pair of hollow axle members 8 and 9 upon which latter the rotors 5 and 6 are rotatably mounted. Said axle members and framework constitute an integral structure.

The framework of girder members 7 is enclosed within a skin or fairing 10 which is secured in any suitable fashion to the girder members and to the axle members 8 and 9 so as to provide a stream-lined enclosure within which the power plant controls and accommodations for crew, passengers and cargo may be contained, as best appears in Figs. 3 and 9. For the sake of simplicity and to promote a more clear understanding of the general arrangement of parts, the girder members 7 have been omitted from the showing of Fig. 3. For the same reason, doors, steps and other incidentals have been omitted from the views.

Support for the empennage 3 and for the landing gear 4 is provided by the axle members 9 and 8, respectively. The wings 2 may be secured to the girders 7 in any suitable fashion.

The fuselage fairing 10, as here embodied, preferably includes a transparent section 11 furnishing a broad and ample field of vision for occupants of the aircraft both in helicopter and in airplane flight.

Suitable accommodations for the crew and passengers are provided in the aircraft so that they will remain at all times in a normal upright position. As here embodied, side-by-side seats 12 are journalled in trunnions 13 and are positioned in operative relation to a pair of side-by-side control columns 14 of a dual control system to be more fully described hereinafter.

The landing gear 4, as embodied, provides a structure for supporting the aircraft in an upright position when at rest upon the ground, as in Fig. 1 wherein the aircraft is depicted in position for vertical take-off in a tail-up attitude.

The landing gear 4 serves the additional purpose of cushioning any undue impact in landing and, as here embodied, comprises cantilever radial legs 15, four in number, each hingedly connected at one end to the axle member 8, its other end being provided with a caster wheel 16. In addition, a central wheeled oleo-type shock-absorbing strut 17 is telescopically and rotatably mounted in the axle member 8 and during landing, by vertical displacement from the dotted line position shown in Fig. 1, absorbs the major portion of the landing shock, and serves to support most of the weight of the aircraft thus permitting the legs 15 to be of light construction.

Streamlining of the landing gear in flight is contemplated and to this end, each radial leg 15 is provided with a hollow wheel-housing 18 hingedly connected thereto by a pin-joint 19 so that upon retracting of the landing gear by swinging the legs together, the wheel-housings 18 and legs 15 will combine to form a streamlined unit co-axial with the fuselage center line and enclosing the oleo-strut 17, as shown in Fig. 3.

Closure (or opening) of the landing gear may be accomplished by any suitable pneumatic, hydraulic, or electric, or other means (not shown) for moving the legs 15 from the open to the closed position or vice-versa, the hollow axle member 8 providing a suitable enclosure for the necessary operating mechanism.

The rotors 5 and 6 of the aircraft of Fig. 1, together form a constant speed differential diameter rotor system by means of which the aircraft obtains the necessary lifting and/or propelling force for helicopter flight and the propelling force for airplane flight.

Means are provided for propelling the rotors 5 and 6 in opposite directions and at unequal angular velocities at which the torque of one rotor will counter-balance the torque of the other when both rotors are expanded. The embodied propulsive means may comprise one or more internal combustion engines and, as here embodied, comprises an air-cooled internal combustion engine 20, Fig. 3, which drives the respective rotors from either end through suitable unidirectional power transmission systems.

Suitable provision for cooling the engine 20 may be made in the form of ducts (not shown) located in the path of the rotor slip-streams and adapted to be supplied with cooling air therefrom during upward or forward movement of the aircraft. Thus, for example, duct openings may be provided adjacent the trailing edge of the wings 2 and close to the tips of these wings so as to be in the slip-stream and be supplied with cooling air therefrom during upward, that is, tail-up movement of the aircraft. Such expedients will be readily apparent to those skilled in the art.

The power transmission system for the nose rotor 5, as here embodied, comprises a free-wheeling clutch mechanism 21 through which power is capable of being delivered in one direction to a gear 22. The gear 22, in turn, engages a larger gear 23 carried on one end of a jack shaft 24 whose other end carries a small double sprocket gear 25. A chain 26 couples the gear 25 with a larger double sprocket gear 27 on the hub of the rotor 5 thus providing a reduction gear system by which a relatively low rotor R. P. M., for example 332 R. P. M., is obtainable at an engine R. P. M. of, for example, 2200 at which full engine horsepower is developed.

Thus, it will be seen that the nose rotor 5 may be power driven in a clockwise direction (viewed from the pilot's seat looking toward the nose) so as to provide a resultant thrust force directed from nose to tail or from tail to nose depending upon the "inflow" and the setting of the rotor blades, as will be described more fully hereinafter. Further, the free-wheeling clutch mechanism 21 permits the nose rotor 5 to auto-rotate, as will be desirable when descending, power off, in helicopter attitude.

The power transmission system for the tail rotor 6, as here embodied, comprises a free-wheeling clutch mechanism 30 through which power is transmitted in one direction of rotation to one end of a drive shaft 31 whose other end carries a small sprocket gear 32 which in turn drives a larger sprocket gear 34 on one end of a jack-shaft 35 through the medium of a sprocket chain 33. The jack-shaft 35 carries at its other end a small double sprocket gear 36 which in turn drives a larger double sprocket gear 38 on the hub of the tail rotor 6, through a sprocket chain 37. There is thus provided a reduction gear system by which the tail rotor 6 is caused to rotate at a lower angular speed than the nose rotor 5, for example, 197 R. P. M., but in opposite torque balancing direction, which in the instant case is clockwise as viewed from the pilot's seat but looking toward the tail of the aircraft. Just as in the case of the nose rotor, the resultant thrust force developed by the tail rotor 6 will be directed from nose to tail or from tail to nose depending on the "inflow" and the setting of the rotor blades as will be more fully described hereinafter. It is to be understood, however, that the total thrust force developed by the nose and tail rotors will be the sum and not the difference of the respective thrusts under all flight conditions. The free-wheeling clutch mechanism 30 permits the tail rotor 5 to be set into auto-rotation, as will be desirable when descending, power off, in helicopter attitude.

The rotors 5 and 6, as embodied, respectively, comprise a plurality of aerodynamically stable lift-producing structures each of which is cable flown so as to be subject to only one degree of restraint in flight and is aerodynamically controllable so as to vary the stable angle of attack at which each said structure meets the air. Variations in the magnitude and direction of the resultant lift force or thrust force of each rotor thus may be effected by the pilot so as to create moments of proper sense and magnitude about the center of gravity of the aircraft for maneuvering the aircraft.

The fore and aft location of the nose and tail rotors with relation to the fore and aft location of the center of gravity of the aircraft must be one which will ensure satisfactory helicopter stability. In the embodiment of Fig. 1, satisfatcory stability is obtained when the center of gravity of the aircraft is located approximately one-third the distance from the nose rotor to the tail rotor. With this center of gravity location established, and bearing in mind the conventional stability requirement in airplane flight of center of gravity with respect to center of pressure, i. e., slightly in advance thereof, the location of the wings becomes established as lying between the rotors 5 and 6 with the wing center of pressure slightly rearward of the one-third point. With other types of aircraft embodying this invention, a different location of the center-of-gravity will obviously be required.

The tail rotor 6, as embodied, is of larger diameter but of lesser lifting area than the nose rotor for reasons of stability and for reasons as will be explained and, as here preferably embodied, is retractable so as to provide a means of adjusting the total rotor system thrust to the thrust requirement demanded by the particular flight condition. For example, in vertical flight, the total thrust requirement is high, being in the order of the gross weight of the aircraft in pounds; whereas in conventional airplane flight the thrust requirement is low, being in the order of one ninth to one fifth the total weight. Since a given total lift-producing area of the rotor, at a given angle of attack, under a given V/ND condition, at a given mean tangential velocity (total), will produce but one value of thrust, it follows that (bearing in mind there is only one angle of attack for optimum L/D) where a large thrust range is required, high efficiency can only be gained by rotor retraction. Thus, by materially reducing the operating radius of the tail rotor 6 lift-producing structures without changing the tail rotor thrust producing area, a major decrease in their mean tangential velocity is obtained with a concomitant decrease in thrust without changing the speed of the nose rotor 5. Thus, one of the four values above-mentioned, namely, the mean tangential velocity (total) may be adjusted to bring about a far better operating angle of attack for both the high thrust and low thrust flight conditions. A theoretical overall propeller efficiency of around 88% results for the rotors, considering both flight conditions.

The retractable tail rotor 6, as here embodied, is provided with the symmetrically located, cable flown, lift-producing structures 40, Fig. 8, which are three in number and of identical construction and configuration so that a description of one is equally applicable to the others.

Each of the embodied lift-producing structures 40 is for convenience sometimes hereinafter referred to as a blade assembly, and is aerodynamically stable, that is, is capable of meeting the air at a stable (constant) angle-of-attack.

Each blade assembly 40, as here preferably embodied and as best shown in Figs. 11 and 12, comprises a blade member 41 and an adjustable pilot-controlled elevator structure 42, carried thereby in spaced following relation thereto upon a hollow outrigger 43, by means of which the stable angle of attack of the blade assembly may be varied.

The blade member 41, as here embodied, is of symmetrical airfoil section, for example, .0012 N. A. C. A. airfoil, and of fairly high aspect ratio, for example, in the order of eleven, and is secured to one end of a high strength, low weight flexible cable 44, preferably a stranded steel cable, by which the blade assembly is adapted to be freely flown in a circular path about the axis of the axle member 9, the inboard end of the cable being anchored to the rotor hub, as will be described more fully hereinafter.

The blade member 41, preferably of spar and rib construction and as shown in Fig. 13, comprises a hollow tubular spar 45 positioned adjacent its leading edge, to which a plurality of framing ribs 46 are attached in any suitable fashion and form a framework over which fabric, metal or other suitable covering material 47 is positioned and is secured.

Certain of the ribs 46 outboard of the outrigger 43 support between them an anchor member 48 of rigid construction to which the outboard end of the cable 44 is securely anchored, the cable lying spanwise of the blade member and preferably passing through the center of gravity of the blade assembly.

Means are provided for damping resonance flutter or other oscillations caused by variations in dynamic and aerodynamic forces to which the blade assembly are subject in flight. The embodied damping means comprises a friction braking device which functions to restrict free relative movement between the cable 44 and the inboard end of the blade member 41 such as may occur in flight in consequence of pivotal movement of the blade assembly relative to the cable 44 at the cable anchor member 48. As here embodied, a damping member 49 of hard rubber or other suitable friction material snugly encompasses the cable 44 by which it is traversed and is clamped between a removable inboard tip section 50 of the blade member 41 and an adjacent terminal framing and stress rib 54 so as to restrict and yet not wholly prevent relative angular movement of the blade assembly at the cable pivot anchor. Centrifugal force, acting upon the blade tip supplies the clamping pressure.

The removable tip section 50, as embodied, may be of any suitable construction which will impart adequate strength thereto so that the blade assembly 40 when retracted may be supported thereby at its inboard end in a feathering blade scabbard, Fig. 23, to be described more fully hereinafter. As here embodied, the tip section 50 is an integral member of wood or other suitable light-weight, high-strength material apertured longitudinally to permit the free passage of the cable 44 and to provide space adequate to permit a limited amount of angular shifting of the blade assembly relative to the cable 44. The tip section 50 is slidably secured to its blade member by means of dowel members 51 and 52 secured at one end to the tip section and extending therefrom through openings 53 in the damping member 49 into slidable engagement with the interior of the spar 45 and the adjacent terminal ribs 54 and 55, respectively.

The adjustable elevator structure 42, as here preferably embodied, is of symmetrical airfoil section and comprises a fixed airfoil member or stabilizer 56 of low aspect ratio carried by the outrigger 43, and an angularly adjustable blade elevator member 57 hingedly connected thereto by means of which the stable angle of attack at which the aerodynamically stable blade assembly 40 meets the air may be aerodynamically varied.

Means are provided for angularly adjusting the elevator member 57 in flight so as to vary the stable angle of attack of the blade assembly. The embodied adjusting means is devised to employ centrifugal force developed by rotation of the blade assembly to effect downward movement of the member 57 and to employ a counter manually applied force to effect upward movement of the member. As here employed, the terms "upward" and "downward" are used with reference to the aircraft in helicopter attitude as in Fig. 1.

As here embodied, a centrifugally responsive sector member 58 is fixed to a shaft 59 journalled at either end in upper and lower bearing plates 60 and 61, respectively, fixedly secured to a suitable supporting framework (not shown) within the blade member 41. The center of gravity of the sector member 58 lies forwardly of its pivotal axis, that is, closer to the leading edge of blade member 41, so that under the influence of centrifugal force it will tend to move in a clockwise direction (as viewed in Fig. 13) and tend to assume a position spanwise of the blade member 41. The forward perimeter of the sector member is preferably provided with a guide groove 62 in which lies a control cable 63, the outboard end of which is secured to a locking plate 64 by which the cable is detachably connected to the sector member. A push rod 65 connects the sector member 58 with the blade elevator member 57, the push rod being contained in part within the outrigger 43, being flexibly connected to the sector member at its forward end by a ball and socket joint 66 radially outboard of the shaft 59 and being connected at its other end to an elevator horn 67 on the upper surface of the blade elevator. Thus, it will be apparent that by exerting an inward pull on the inboard end of the cable 63, the blade elevator member 57 will be moved upward to provide a couple acting about the center of gravity of the blade assembly which will operate to increase the stable angle of attack at which the blade assembly 40 meets the air. It is further apparent that the blade elevator cable 63 will be in tension at all times during rotation of the blade assembly due to the effect of centrifugal force on the eccentrically mounted sector member 58. This force is therefore utilizable to restore the blade elevator member 57 to its neutral position, as in Fig. 14, or to any intermediate position merely by paying out on the cable 63 which (at all times that the blade assembly is in its expanded operating position) is under the pilot's control as will be more fully described hereinafter.

A modified form of aerodynamically stable blade assembly 40 is shown in Fig. 11A wherein a cable flown blade member 68 of symmetrical air foil section is recessed at its trailing edge portion and includes within its confines a pair of blade elevator members 69 and 70 which are simultaneously equally angularly adjustable upwardly from the zero lift position shown to increase the stable angle of attack at which the blade assembly meets the air. The means for operating the blade elevators, though not shown, may be similar to that employed in the embodiment of Fig. 13 except that duplicate sector members are utilized, one for each blade elevator, each being connected to the common elevator cable 63 for simultaneous operation.

Another modified form of aerodynamically stable blade assembly is shown in Figs. 11C and 11D. As there embodied, the symmetrical blade member 68 includes the blade elevator members 69 and 70 within its confines and is combined with a lifting surface 71 which is supported in fixed relation thereto upon an outrigger 72 extending forwardly from the leading edge portion of the blade member 68 so as to provide an aerodynamically stable blade assembly of the Canard type. Operating mechanism similar to that utilized for the embodiment of Figs. 11A—11B may be employed for effecting angular adjustment of the blade elevator members 69—70.

The flight cables 44, to the outboard end of which the blade assemblies 40 are secured, provide the sole restraining means for the blade assemblies in flight. The flexible nature of the cables 44 permits the blade assemblies freely to seek and attain whatever equilibrium coning position the resultant of the aerodynamic, inertia, and centrifugal forces acting upon the blade assemblies may require. Thus, the blade assemblies are restrained only against movement axially of the cables 44 and are therefore subject to only one degree of restraint in flight.

Means are provided for retracting and expanding the tail rotor at will. As here embodied, an anchoring and winding drum 74, Fig. 17, of generally cylindrical contour having a right hand triple thread on its periphery is journalled, at either end, on the axle member 9 on suitable anti-friction bearings, which function to maintain the drum 74 in axially fixed relation to the axle 9. As here embodied, ball bearings 75 and 76, Fig. 19, fixedly carried by the axle member 9, rotatably support the drum 74 at either end thereof.

The drum 74 provides an anchor for the flight cables 44 which are secured at their inboard end to the drum, the respective cables passing through equally circumferentially spaced openings 83, respectively, successively located in different grooves of the triple-thread, the cables being respectively secured and dead ended to the drum internally thereof in any suitable fashion. Each of the openings 83 is preferably located near the starting point of its groove.

The drum 74 also provides an anchor for the inboard end of the respective blade elevator cables 63, the drum as embodied being provided with means for paying out or pulling in on the blade elevator cables 63 in response to a given movement of the pilot's control column while the drum is rotating and the blade assemblies 40 are in flight in their fully extended position.

As here embodied, a plurality of sheave cranks 84, three in number, are pivotally mounted on fixed shafts 85 extending outwardly from the drum 74. The respective sheave cranks lie tangentially of the drum in equal angularly spaced relation to each other in proximate relation to the inboard ends of the respective flight cables 44 and provide an anchor to which the respective elevator cables 63 are secured and dead ended at their inboard end. The sheave cranks 84 are identical, each having a circumferentially extending groove 84a, of curved contour, to avoid sharp bending of the elevator cables.

The respective elevator cables have the inboard end of each wrapped around its sheave crank within the groove 84a thereof so that as the sheave crank 84 is rotated counter-clockwise, as viewed in Fig. 17, its elevator cable 63 will be drawn inboard and thereby elevate the elevator member 57 to which it is operably connected, as has previously been described.

In order that the sheave cranks 85 may be rotated, a plurality of push rods 87, three in number, are reciprocably mounted in the front annular end wall 78 of the drum 74, the circumferential periphery of the end wall forming the double sprocket gear 38 by which the drum is rotated.

The push rods 87 have their axes parallel to each other and to the axis of the axle member 9 about which latter they are arranged at equal angular distances from each other and at equal radial distances from the axis of the axle member 9.

One end of each push rod 87 is adapted to engage one of the sheave cranks 84 at a distance from its pivot shaft 85 which will provide a satisfactory mechanical advantage for easy counter-clockwise displacement of the sheave crank about its axis, the sheave cranks 84 being provided with lever arms 84b for this purpose. The opposite end of each push rod is lodged in a push rod ring 243 which is journalled for rotation on the axis of the axle member 9 and is axially and angularly adjustable relative thereto in response to a given movement of the pilot's control column 14, as will be more fully described hereinafter, so as to obtain equal or differential angular displacement of the sheave cranks 84.

Since centrifugal force acting through the elevator cables 63 would normally tend to rotate the sheave cranks 84 clockwise, pins 86 are provided in the drum 74 against which the arms 84b abut thereby fixing the limit of clockwise movement of the sheave cranks 84 which is of particular importance when the push rods 87 are wholly withdrawn, as will hereinafter appear more fully. The pins 86 are preferably so located that when abutted by the lever arms 84b, the elevator members 57 will be in a neutral or substantially zero lift position such as that shown in Fig. 14 of the drawings.

Means are provided for simultaneously winding the flight cables 44 and the elevator cables 63 on the winding drum 74 so as to retract the blade assemblies. As here embodied, a nut 88 having an internal triple thread corresponding to that of the drum 74 threadedly engages the drum, as is best shown in Fig. 19, and carries identical sheave hangers 89, three in number, which extend radially outwardly from the nut 88 to which they are fixed at equally angularly spaced intervals.

Each of the hangers 89 is apertured at its extremity to receive a king pin 90 secured thereto and upon which is pivotally mounted a scabbard hanger 91 upon which is revolubly mounted a feathering scabbard member 92 in which latter the inboard tip of blade assembly 40 is adapted to be seated when retracted.

The respective king pins 90 carry a set of parallel winding sheaves 93 and 94 which are revolubly mounted thereon and are located between the arms of the related scabbard hangar 91. The common axis of each king pin and its sheave set is suitably inclined with relation to the axis of the axle member 9 so that each sheave set will be rigidly aligned with a different groove of the triple thread on the drum 74, this relationship being retained regardless of the position of the nut 88 on the drum 74.

Each set of sheaves 93—94 is traversed by one of the three sets of flight and elevator cables, 44 and 63, respectively, by which each blade assembly 40 is connected to the winding drum. As will be observed from Fig. 22, each cable set runs between the drum 74 and the sheave set over which it travels so that if the nut 88, Fig. 22, be rotated clockwise relative to the drum 74, Fig. 22, the sheaves 93, 94 will wind the cables 44, 63 on the drum so as to reduce the operating radius of the blade assemblies 40.

In the fully expanded position of the tail rotor, the resultant of the centrifugal and aerodynamic forces acting on each blade assembly will produce pull on each cable acting tangentially of its sheave 93 and outside of the rotational axis of the drum 74 at a radial distance therefrom governed by the instantaneous torque requirements of the rotor. A low or zero torque condition is indicated, for example, by the dotted line position of the blade scabbard and its hanger shown in Fig. 22, the full line position of the blade scabbard and its hangar representing a high torque condition such as would be required during helicopter ascent.

Each blade scabbard 92, as here embodied, is internally contoured, as best shown in Fig. 23, to match the contour of the inboard end of the blade member 41 to be sheathed therein and is apertured at its inboard end to provide a passageway 95 through which the cables 44 and 63 of the blade assembly which it sheathes may pass during expansion and retraction of the blade assembly.

The respective blade scabbards 92, as embodied, are revolubly mounted on their hangers 91 on suitable anti-friction bearings so that the scabbards may feather in alignment themselves with the slip-stream as they revolve, each being provided with a suitable feathering fin 96 for assuring the alignment.

In the scabbard bearing structure, as here embodied, the hangar 91 is provided with an internal annular flange 97 and telescopically receives an annular flange portion 98 of the blade scabbard. Ball bearings 99 interposed between a shoulder 100 on the blade scabbard and the flange 97 and between the flange 97 and an annular retaining ring 101 removably secured to the flange 98, complete the mounting.

Means are provided for fairing the respective sets of parallel cables 44 and 63 to reduce drag, to lessen vibration of the cables in flight and to permit the cables 63 to operate with freedom. The embodied fairing means may be of any suitable material and construction which will lend itself to performing the desired function and yet not interfere with retraction of the blade assemblies, winding on the drum 74 or in and out operation of the control cables 63. As here embodied, the respective sets of cables 44 and 63 traverse a succession of apertured individual fairing members 102, Fig. 18, which abut each other, Fig. 17, and provide a streamlined covering for the cables from the inboard end of the related blade assembly 40 to the interior of the related blade scabbard 92. The respective fairing members are preferably of soft metal, such as aluminum, for example. Each slidably engages its cable 44 and its cable 63 so that free in and out movement of the latter will not be prevented. Through the action of centrifugal force, the streamlined beading or fairing thrusts against the last outboard bead which is firmly anchored on cable 44 clear of the inboard blade tip. Thus, the beading provides a streamlined flexible tubular channel through which the elevator control cable 63 may operate with freedom.

One surface of each fairing member is grooved as at 103, Fig. 18, so that the member will track on the sheaves 93 and 94 as the blade assemblies are retracted, the opposite surface being suitably contoured to seat in the groove on drum 74. Fairing of the main cable 44 only is preferred at the inboard end of the blade scabbard 92 to assist in starting the fairing structure over the sheaves 93—94 during retraction. Fairing members 104 of this nature are shown in Fig. 17.

In the fully expanded position of the tail rotor 6 such as is shown in Fig. 1 and Fig. 17, the nut 88, Fig. 17, is at its extreme forward position and further rotation of the nut 88 in a counter-clockwise direction on the drum 74 is prevented by a pin 105, Fig. 22, which is removably secured to the drum 74 and is abutted by a lug 106 on the nut 88.

Means are provided for effecting clockwise rotation of the nut 88 on the winding drum 74, Fig. 22 (which drum constitutes the "bolt" of a "nut" and "bolt" assembly), so that each set of winding sheaves 93 and 94 will wrap its set of cables 44 and 63 on the drum and in a separate groove of the triple thread thereof.

As here embodied, the drum 74 is fluted so as to form the longitudinally-extending grooves 107, Fig. 22, three in number, which are spaced equal angular distances from each other circumferentially of the drum.

The respective grooves 107 terminate at either end in openings 108 and 109, Fig. 19, in the circumferential periphery of the drum. Planet gears 110 and 111, located in the opening 108 and 109, respectively, are secured to either end of each shaft 112 which is adapted to be driven by one or the other.

The respective shafts 112, are journalled at either end in the end walls 77 and 78 of the drum and are longitudinally slotted as at 113, Fig. 19.

A gear 114 is slidably mounted on each shaft 112 for rotation therewith, the gear being journalled in a carriage formed by bearings 115 and 116 at either side of the gear. Rotation of the gear 114 on its shaft 112 is prevented by a key member 117 slidably seated in the keyway 113 and fixedly engaging the gear.

The nut 88 is belled at one end to form a shroud 119 for the bearings 115—116, the shroud lying in annular spaced relation to the drum 74 and having an internal toothed, annular flange or ring gear 118 engaging the planet gears 114.

The bearing members 115 and 116 are suitably dimensioned so as to seat in and be supported by the troughs 107 thereby to relieve the shafts 112 from loads which might bend the shafts and render operation difficult. The shafts 112 are likewise suitably dimensioned and arranged within the grooves 107 so that they will lie beneath and clear of the cables 44 and 63 when they are wound on the drum.

Thus it will be observed that by rotating the shafts 112 the gears 114 will effect rotation of the nut 88 relative to the drum 74 and, in proper case, wrap the cables 44 and 63 on the drum so as to retract the blade assemblies 40.

Means are provided for driving the shafts 112 in either direction at will to effect the desired retraction or extension of the blade assemblies. Operation of the embodied driving means is necessarily coupled with operation of the tail rotor blade elevators, the controls of which must be rendered inoperative at all times except when the tail rotor is in a fully expanded position. Fig. 19 depicts the relationship of the driving means and of the blade elevator control mechanism at the start of retraction, the blade elevator control mechanism having been rendered inoperative and the shafts 112 having been coupled with the driving means so as to be rotated in a clockwise direction as viewed in Fig. 22.

Clockwise movement of the shafts 112 is effected by means of an annular sleeve gear 121 which is freely journalled on the axle member 9 within the drum 74 and in axially fixed relation thereto and engages the planet gears 110.

The gear 121 normally rotates with the drum 74 but is adapted to be braked and immobilized so that the gears 110 will revolve thereabout in planet fashion and in a clockwise direction so as to rotate the shafts 112. The gear 121, as here embodied, comprises a braking sleeve 123 of cylindrical contour which extends in coaxial alignment with the axle member 9 and in spaced annular relation thereto, being supported at its forward extremity upon an annular bearing member 124 which is journalled on the axle member 9.

The sleeve 123 functions as a brake drum adapted to be engaged by suitable pilot controlled braking mechanism, hereinafter described, to immobilize the gear 121 at will.

Reverse rotation of the shafts 112 is adapted to be effected by suitable sun and planet gearing at the opposite end of the shafts 112. As here embodied, a sleeve gear 125 is journalled on the axle member 9 in fixed axial alignment therewith and is operatively coupled with the gears 111 (see Figs. 19 and 20) through a number of reverse idler gears 127 located on the openings 109 and journalled on shafts 128 extending axially inwardly of the drum 74 from the end wall 78 of the drum.

The sleeve gear 125 normally rotates with the drum 74 but is adapted to be braked and immobilized so as to effect planetary movement of the gears 111 and 127 thereabout to the end that the shafts 112 may be rotated in a counter-clockwise direction as viewed in Fig. 22 and unwinding of the cable sets be obtained.

As here embodied, the sleeve gear 125 is bell-mouthed to provide a braking sleeve 129 of cylindrical contour which is secured at its extremity to an annular bearing member 130 journalled on the rotor sleeve bearing 9. The sleeve 129 functions as a brake drum adapted to be engaged by suitable pilot controlled braking mechanism to immobilize the gear 125 at will.

The embodied braking mechanism may be pneumatically, hydraulically or otherwise suitably actuated and may be of such form and arrangement as will best suit the particular space limitations and requirements. As here embodied, Fig. 19, brake shoes 131 of cylindrical contour and three in number are situated in the annular space between the braking sleeve 123 and the axle member 9 at equal angularly spaced intervals. Similarly, brake shoes 133 are situated in the annular space between the braking sleeve 129 and the axle member 9. As shown in Fig. 19, at the start of retraction the brake shoes 131 are in braking engagement with the braking sleeve 123 so that the gear 121 is thereby immobilized and clockwise rotation of the shafts 112 and nut 88, as viewed in Fig. 22, will ensue. In this condition, wherein rotor retraction is just starting, the brake shoes 133 are out of engagement with the braking sleeve 129. This relative condition will be maintained until the rotor assemblies 40 have been fully retracted at which time brake shoes 131 will be automatically released and the nut 88 locked against further rotation and translation relative to the drum 74, as will be more fully described and explained hereinafter.

The brake shoe actuating mechanism, as embodied, is coupled with suitable mechanism which renders the blade elevator controls inoperative just prior to the commencement of retraction. As here embodied, each brake shoe 131 is secured to a radial brake shoe pin 135 slidably reciprocably mounted in the axle member 9. The pins 135, three in number, are each pin-connected at their inboard extremity, by a spring pressed telescopic toggle arm 136, to one end of a tubular toggle actuating member 138 concentric with the axle member 9.

Similarly, the brake shoes 133 are pin-connected to the opposite extremity of the toggle actuating member 138 by spring pressed telescopic toggle arms 140 and brake shoe pins 141.

The toggle actuating member 138 is normally in a neutral position in which the respective sets of brake shoes 131 and 133 are retracted as would be the case where the tail rotor is in expanded position and the elevator controls have not been rendered inoperative. But as shown in Fig. 19, the toggle member 138 has been moved upwardly, i. e., toward the rear of the aircraft, so that brake shoes 131 are engaged. In consequence, there has been an extension of the toggle arms 140 so as to provide the necessary flexibility for upward movement of the toggle member 138. Movement in the opposite direction so as to engage the brake shoes 133 would result in a corresponding extension of the telescopic arms 136.

Means are provided for moving the toggle member 138 axially in either direction from its normal neutral position to effect selective application of one or the other of the sets of brake shoes 131 and 133 and for rendering the tail rotor blade elevator controls inoperative at the start of and during retraction, in fact at all times except when the tail rotor is fully expanded. As here embodied, a plunger 144 is slidably coaxially mounted in the toggle member 138 in which it is centered at either end thereof by discs 145 and 146 apertured for the purpose. A shoulder 147 on the plunger is adapted, after a predetermined upward movement of the plunger 144 from its normal neutral position, to engage an annular washer 148 which is normally seated on a shoulder 150 of the toggle member and to move the washer upwardly to the position shown in Fig. 19, against the resistance offered by a strong coiled spring 149 surrounding the rod or plunger 144. The upward movement of the washer 148 is transmitted by the spring 149 to a washer 151 through which the plunger 144 passes, said washer 151 contacting in turn abutment 151a integral with the toggle member 138 which latter is in consequence moved upwardly to the position shown in Fig. 19 wherein brake shoes 131 have been applied and rotor retraction is just commencing.

The initial upward movement of the plunger 144 is utilized to render the blade elevator controls inoperative by disengaging the push rods 87 from contact with sheave cranks 84. During this initial movement, and before the shoulder 147 has contacted the washer 148 which in its normal position is seated on the internal abutment 150 as has previously been pointed out, the member 138 is in a neutral position in which the sets of brake shoes 131 and 133 will be out of contact with the braking sleeves 123 and 129, respectively. Centering of the member 138 in its normal neutral position is effected by the coiled spring 152 coaxial therewith which is anchored at one end to the toggle actuating member 138 and at the other end to the stationary spring seat member 153 of an annular spring seat 154 which latter is anchored to the axle member 9.

Means are carried by the rod member 144 for actuating the devices by which the blade elevator controls are rendered inoperative in the interval before the brakes 131 are applied and retraction commences. As here embodied, the plunger member 144 is provided with an arm 155 which terminates in a guide yoke 156 which in turn slidably spans a cable coupling member 157 secured to an endless cable 158.

The coupling member 157 is formed with a shoulder 159 which the arm 155 is adapted to engage. It will be observed that the rod 144 in the position shown in Fig. 19 has been moved upward, that is, rearward in the aircraft, to the full extent of its travel and, in doing so, has carried the cable member 157 rearwardly in the aircraft from a more forward position into the position shown. This operation is performed by the plunger 144 before brakes 131 are applied. The cable member 157 is held in this position against the resistance offered by a coiled spring 160 until released, by a spring pressed latch 161, which automatically seats itself beneath a latch operating shoulder 162 of the cable member 157 when the latter reaches the position shown in Fig. 19.

The movement of the cable member 157 effects an equal movement of the cable 158, the cable movement being transmitted through suitable mechanism to a universally mounted pilot-operated push-rod carrier 164 which, in consequence, is moved forwardly in the aircraft into the position shown in Fig. 19 in which the sheave-crank push rods 87 are out of contact with the sheave-cranks 86 and the blade elevators are no longer subject to pilot control.

The cable 158 is of the endless type and (starting from the forward end of the cable member 157) runs around the upper sheave 165 of a pair of parallel coaxial upper and lower idler sheaves 165 and 166, thence around a sheave 163 coaxial with the axle member 9, thence around the lower sheave 166 of the aforementioned idler sheaves and thence around an idler sheave 167 carried by the axle member 9 on an axle 168 and so back to the cable member 157 to complete the circuit. This circuit may be easily traced in Fig. 28. Thus it will be observed that the rearward movement of the cable member 157 to the position shown in Fig. 19 will effect a given counterclockwise movement of the sheave 163 as the latter is viewed looking toward the tail of the aircraft.

Means are provided for converting rotational movement of the sheave 163 into axial movement of the push rod carrier 164. As here embodied, the sheave 163, journalled in suitable parallel, spaced anti-friction bearings in a sheave frame 172, is centrally apertured, splined, and slidably receives the splined head of a bolt 174 which has a high pitch multiple right hand thread on its shank.

The bolt 174 forms the female member of a ball and socket type universal joint and to this end its head is suitably recessed for the reception of a suitably contoured male member 175 coaxial with and forming a part of the push rod carrier 164. A retaining ring 176 releasably secured the joint members to each other.

The shank of the bolt member 174 is preferably formed with a high pitch multiple right hand spiral thread and threadedly engages a sheave nut 179 journalled in sheave frame 172 so that a relatively slight rotation of the sheave 163 will create considerable axial movement of the bolt 174 and hence of the member 164 which it carries in the manner described. A recess 178 of cylindrical contour extends coaxially of the bolt throughout a major portion of its length and slidably receives one end of the plunger 144 thereby to provide the necessary terminal bearing for the plunger.

The sheave nut 179 being threadedly engaged with the shank of the bolt 174 and being fixed against axial movement, permits axial movement of the bolt 174 and of the push rod carrier 164 to be effected independently of the sheave 163 in consequence of its rotation.

As here embodied, the sheave nut 179, Fig. 19, is traversed by an endless cable 249 running over a pair of idler sheaves 179a and 179b (Fig. 20) carried by the sheave frame 180. The respective flights of the cable 249 are connected to an "angle-of-attack" lever 330 (Fig. 28) by means of which the pilot can pull on either flight of the cable so as to rotate the sheave nut 179 in either a clockwise or counter-clockwise direction. Counter-clockwise rotation of the sheave nut 179, as viewed from the nose of the aircraft will result in a rearward axial movement of the push-rod carrier 164 and hence of the push rods. Clockwise movement of the sheave nut 179 will effect a forward movement of the push rod carrier and the push rods.

Pilot controlled means are provided for actuating the plunger 144, the means being pilot controlled. As here embodied, a cable 182 is wrapped around and secured to a double sheave 183 on a shaft 184, the cable ends being anchored to an expansion-retraction lever 237, as shown in Fig. 28. A pinion gear 185 on the shaft engages a rack 186 forming the rear terminus of the plunger 144 so that by moving the lever 237 the pilot may move the plunger 144 in either direction.

Referring again to Fig. 19 a shoulder 187 is formed on the plunger 144 between the rack 186 and the toggle member 138 and the plunger 144 is slidably supported intermediate the rack 186 and the shoulder member 187 in an axially movable spider member 188.

A latch member 189 is pivotally mounted on the spider member 154 and is urged in a counter-clockwise direction, as viewed in Fig. 19, by a spring 190 toward the plunger 144 so that it will slip under the shoulder 187 after a predetermined rearward movement of the plunger 144, thereby to lock the plunger against return movement until released.

Thus, it will be observed that the initial rearward movement of the plunger 144 will have moved the cable member 157 rearward to the position shown in Fig. 19 thereby rotating the sheave 163 counter-clockwise as viewed from the nose of the aircraft and moving the push-rod carrier 164 forwardly to withdraw the push rods 87 from engagement with the sheave cranks 84 and thereby render the blade elevator controls ineffective. This is necessary so that when the cables 44 and 63 are wrapped on the drum 74, there will be a complete disengagement between the carrier 164 and the sheave cranks 84 and "freezing" of the pilot's control column will not ensue. Further movement of the plunger 144 results in engagement of the shoulder 147 with the washer 148 which pressing the spring 149 against washer 151 and through abutment 151a moves the toggle member 138 rearwardly so as to expand the brake shoes 131 into contact with the braking sleeve 123. Upon completion of the movement, the latch member 189 slips under the shoulder 187 and locks the plunger 144 against return movement.

The brake shoes 131 immobilize the sleeve gear 121 thereby causing the shafts 112 to rotate, the rotation being transmitted through the respective gears 114 to the ring gear 118 of the winding nut 88 which rotates clockwise relative to the drum 74 as viewed in Fig. 22, and, by its movement, wraps each set of cables 44 and 63 in a separate groove of the triple thread on the drum 74 until the tail rotor is in a completely retracted condition. As the rotor is retracted, the respective blade assemblies which are still rotating, though at a reduced mean tangential velocity consequent upon reduced operating radius and throttling of the engine just prior to initiation of the retracting operation, automatically feather in the axial air stream and enter the scabbards 92 by which they are supported when the rotor is at rest.

In the retracted state, the pull on the cables 44 acting through the blade members 41 moves the scabbard hangars 91 about the shafts 90 of the sheave brackets to the dotted line position shown in Fig. 22, which position is preferably such that the extended axis of each cable 44, between its sheave 93 and scabbard 92, is not only tangent to the winding sheave 93 over which it passes, but extends through, or substantially through, the rotational axis of the drum 74 so that a no-torque condition is achieved. When fully expanded, the torque for each blade assembly of the tail rotor is equal to the pull on the cable 44 times the radius R in Fig. 22. The total torque is transmitted from the lug 105 through the arm 106 to the nut 88 in the fully expanded position.

Means are provided for automatically locking the winding nut 88 against unwinding when it reaches the limit of its rearward travel, and also means for automatically restoring the braking mechanism 131 to a neutral position at that time so that unnecessary wear of the brake shoes 131 may be avoided and expansion of the rotor may thereafter be initiated at will. As here embodied, a hook bar 191 is slidably supported in a pair of brackets 192 (Figs. 19 and 22) which extend inwardly from one of the troughs 107 of the drum 74, and are located between the sleeve gears 121 and 125, and are preferably provided with removable cover plates so that removal and replacement of the hook bar may be carried out if the need arises.

The hook bar 191 is provided at either end with fingers 196 and 197 which extend through slots 198 and 199, respectively, in the trough 107 and are adapted to be engaged by the shroud bearing members 115 and 116, respectively, upon completion of a predetermined movement of the nut 88 so as to shift the hook bar longitudinally in one direction or the other depending upon whether retraction or expansion has been carried out. This shifting of the hook bar is employed upon completion of retraction to release the latch 189 by which the plunger 144 is locked in its extreme rearward position during retraction; and, upon completion of expansion to release a latch 200 by which the plunger 144 is locked in its extreme forward position during expansion, as will be more fully described hereinafter.

Striker members 201 and 202 are secured to the hook bar 191 intermediate the brackets 193 and 194 and in spaced relation to each other so as to permit the entry and passage therebetween during rotation, of a lever member 203 which extends through an opening 204 in the axle member 9 and is pivotally secured thereto intermediate its ends upon a shaft 205.

The striker members 201 and 202, as here embodied, are provided with oppositely cam surfaces 206 and 207, respectively, preferably of cylindrical contour. The outboard end of the lever member 203 is provided with a ball member 208, preferably of barrel contour, which is journalled on the lever member. The inboard end of the lever member 203 is pin connected to a latch bar 210 which is slotted adjacent either end to provide equal length slots 211 and 212, respectively, in which the latch members 189 and 200, respectively, are slidably anchored.

The latch member 200 functions to lock the plunger 144 in its extreme forward position during expansion of the rotor and is normally urged in a clockwise direction, as viewed in Fig. 19, by a coiled spring 213 secured at one end to the sheave frame 180 and at the other end to the latch 200, so as to seat the latch 200 behind the push rod immobilizing arm 155 when the plunger 144 is moved forwardly to its extreme forward position to effect rotor expansion. As here embodied, and as viewed in Fig. 19, the latch 200 is pivotally mounted by and between a pair of arms 217 and 218 (Fig. 22) which project rearwardly from the sheave frame 180 (Fig. 19) in spaced parallel relation to each other. An arm 219 of the latch is slidably anchored at its outboard extremity in the slot 212 of the latch bar. Another arm 220 extends forwardly (Fig. 19) so as to seat behind the immobilizing arm 155 when the rod member 144 is moved from its neutral position to its extreme forward position. Pivotally secured to the latch arm 220 is a hook member 221 which is slotted as at 222 and slidably engages a pin 223 on the arm 155. The terminus of the arm 221 is provided with a hook 224 which, as will be more fully described hereinafter, is adapted to engage a shoulder 225 on the latch 161 and, by moving the latch member 161 against the resistance offered by a latch spring 226, releases the cable member 157 when expansion is completed so that it may move forwardly as urged by spring 160 and restore the blade elevators to pilot control.

Means are provided for preventing forward movement of the nut 88 after rotor retraction, in the form of suitable ratchet mechanism which automatically locks the nut 88 against return movement and holds it so until released manually as expansion is initiated. As here embodied, the shroud 119 of the nut 88 is faced with an annular toothed clutch ring 227 removably secured thereto in any suitable fashion. Opposite the clutch ring 227 at the rear extremity of the drum 74 is an annular clutch ring 228 having a complementary toothed face.

The clutch ring 228 is slidably coaxially mounted on the end wall 77 of the drum 74 for movement axially of the drum 74 and is preferably keyed to the drum in any suitable fashion. A plurality of lever arms 229 are respectively pivotally connected to the clutch ring at the outboard extremity of each and at equally circumferentially spaced points of the clutch ring. The lever arms 229 have their respective inboard extremities lodged in sockets 230 of an annular race member 231 surrounding the axle member 9 and are slidably fulcrumed intermediate their ends on brackets 232 carried by and rotatable with the drum 74.

The race member 231 forms the outer race of an anti-friction ball bearing assembly of which the inner race is formed by a ring 233 which is in turn fixedly secured to the spider member 188 by threaded lugs 234 which extend through slots 235 in the axle member 9. Thus it will be observed that movement of the spider member 188 in one direction will effect movement of the clutch ring 228 in the opposite direction. Springs 236 between the spider member 188 and the annular spring seat member 154 normally hold the former at the rear terminus of the slots 235 until the clutch ring 228 is displaced rearwardly by contact with the nut 88.

When the tail rotor is fully retracted, the clutch ring 227 slidably contacts the clutch ring 228 and moves it rearwardly against the resistance offered by springs 236, so long as the nut 88 advances. Immediately following engagement of the clutch rings 227 and 228, the shroud bearing 116 contacts the arm 197 of the hook bar 191 and moves it rearwardly thereby causing the ball end 208 of the lever 203 to contact the cam face 207 of the striker member 202 as the latter rotates. The lever 203 is substantially instantly thrown so as to move the latch bar 210 forward and, by this forward movement, the latch bar disengages the latch 189 from the shoulder 187 and releases the plunger 144. The plunger 144 moves forward under the force exerted by the spring 149 until the washer 148 seats on the abutment 150, thereby relieving the pressure on the brake shoes 131 and permitting centering spring 152 to return toggle member 138 to its neutral position. The sleeve gear 121, freed by release of the brake shoes 131, resumes rotation on the axle 9 thus terminating further relative rotation of the nut 88 and drum 74. Unwinding of the nut is now prevented by the interlocked teeth on the clutch rings 227 and 228. The toggle actuating member 138 having been moved to its central neutral position by the centering spring 152, a shoulder 237 on the plunger 144 will now be in operative position against the washer 151 which remains in light contact with abutment 151a of toggle actuating member 138. This forward movement of the rod 144 to its neutral position also rotates the sheave 183 through interaction of the rack and pinion members 186 and 185, to move the cable 182 and automatically return the retraction-expansion lever 237 (Fig. 28) from its forward retraction position to its central neutral position. The same forward movement of the rod 144 carries the arm 155 forwardly along the cable member 157 and in doing so rotates the latch release arm 221 in a counter-clockwise direction as viewed in Fig. 19 to a position adjacent the latch 161 so that upon further forward movement of plunger 144 the hook 224 will engage the shoulder 225 and be in position to release the latch 161.

In order now to expand the rotor, the expansion-retraction lever 237 is pulled rearwardly and the plunger 144 is thereby moved forwardly from its neutral position to its extreme forward position. In consequence, the front latch 200 is rotated by the spring 213 so that the latch arm 220 slips behind the immobilizing arm 155 and locks the plunger 144 against return movement for the time being. This rotation is made possible because the latch bar 210 having previously been moved forward and held by the striker plate 207 is positioned so that the slot 212 in the latch bar is in position to allow the arm 219 to slide forwardly therein. The same rotation of the latch 200 causes the hook 224 to engage the shoulder 225 of the latch 161 preparatory to disengaging the latch from the shoulder 162.

As the plunger 144 moves forwardly, the rack 186 contacts the clutch spider 188 and moves the spider forward so as to disengage the clutch ring 228 from the clutch ring 227 thereby freeing the nut 88 for rotation on the drum 74. At the same time the shoulder 237 on the plunger 144 presses washer 151 forward compressing spring 149 against abutment 150 of the toggle actuating member 138 and forces it forward, thereby displacing the toggle arms 140, whereby the brake shoes 133 are caused to engage the braking sleeve 129 of the sleeve gear 125.

The sleeve gear 125 is in consequence immobilized, the braking action causing the idler gears 127 and shaft gears 111 to travel around the sleeve gear 125 and, in consequence, to rotate the shafts 112 to effect a counter-clockwise unwinding movement of the nut 88 on the drum 74 as viewed in Fig. 22. As the cables 44 and 36 unwrap they are caused to move outwardly through the blade scabbards 92 under the influence of centrifugal force acting on the respective blade assemblies, until the cables are fully unwrapped.

As the nut 88 approaches the limit of its forward travel during expansion, the shroud bearing 115 contacts the arm 196 of the hook bar and moves the hook bar forward causing striker member 201 to engage and displace the ball end 208 of lever 203. The latch bar 210 is moved rearwardly in consequence into the position shown in Fig. 19 and in doing so moves the latch 200 counter-clockwise, as viewed in Fig. 19, thereby releasing the rod 144 which is restored by the centering spring 152 to its normal neutral position. The initial counter-clockwise movement of the latch 200 displaces the latch arm 221 sufficiently to cause the hook 224 to release the latch 161 thereby permitting the spring 160 to return the cable member 157 to its starting position.

Restoration of the cable member 157 to its starting position rotates the sheave 163 clockwise, viewed toward the tail of the aircraft, and thereby moves the push rod spider 164 rearward sufficiently to cause the push rods 87 to contact the sheave cranks 84 so that operation of the blade elevators is again made possible by movement of the pilot's control column as will be more fully described hereinafter.

The restoration of the toggle actuating member 138 to its neutral position frees the sleeve gear 125 so that it again rotates with the drum 74. The nut 88 is now limited from further rotation by contact between lug 106 and the torque lug 105.

It will be observed that rotation of the tail rotor creates, through centrifugal force, tension in cables 44 which tends to cause the nut 88 to unwind on the drum when in its retracted position. The system provided for unwinding the nut therefor functions more to limit the unwinding speed of the nut than to effect the unwinding.

The push rod carrier 164 provides the means for transmitting a given movement of the control columns 14 to the sheave cranks 84 so as to obtain equal or differential adjustment of the blade elevators. As here embodied, radially extending arms 238, four in number, extend from a hub 239 normally coaxial with the axle member 9. Each arm carries at its extremity a removable spoke 240 which extends through a longitudinal slot 241 in the axle member 9 into engagement with a rotationally fixed rim or annulus 242 surrounding and normally coaxial with the axle member 9. Each slot 241 is suitably dimensioned to permit slidable longitudinal displacement of its spoke 240. An annulus 243 is journalled on the rim 242 on a ball bearing mounting 244 so that the annulus 243 may rotate relative to the rotationally fixed annulus 242.

The rotatable annulus 243 is provided with relatively short radial passages 245 (Fig. 21) of generally cylindrical contour which extends inwardly from the outer rim of the annulus and are radially slotted as at 246 to permit the entry of and ensure the retention of the ball ends 247 of the push rods 87 in the annulus. The passages 245, three in number, are circumferentially spaced through equal angular distances, one passage being provided for each push rod.

The carrier 164 is also universally angularly adjustable by reason of the ball and socket joint comprised of the elements 174 and 175 to obtain adjustment of the blade elevators as for example, by adjustment of the carrier 164 to the dotted line positions shown in Fig. 19. A lever arm 248 anchored within the hub 239 has its forward terminus (not shown in Fig. 19 but depicted in Fig. 28) connected to the control columns 14 through a suitable cable system (Fig. 28) by which the desired correlated adjustment of both the tail rotor blade elevators and the front rotor blade elevators may be effected, as will be hereinafter described.

The nose rotor 5 (details of which are best shown in Figs. 24-27 inclusive) is mounted for rotation on the axle member 8.

The nose rotor 5, as embodied, may be either retractable or non-retractable. If non-retractable, the nose rotor is so constructed that the respective lift-producing structures will be supported in cantilever fashion when the rotor is at rest, but will still be subject to only one degree of restraint in flight.

As here embodied, a hub 250 is journalled on the axle member 8 on suitable anti-friction bearings 251 and 252 at either end of the hub, the hub 250 being provided at its rear terminus with the double sprocket gear 27 which is engaged by the chain 26 by which the rotor is driven.

A plurality of lift-producing structures 255 are cable flown from the hub 250 at circumferentially spaced points symmetrically positioned relative to the rotor axis of revolution. Any practical number of such structures providing a symmetrical system may of course be used.

The lifting structures 255, sometimes hereinafter referred to as blade assemblies, one of which is depicted in Fig. 10, as embodied, are aerodynamically stable lift-producing structures, that is, they are structures which are capable of meeting the air at a stable (constant) angle of attack, just as in the case of the tail rotor blade assemblies. Each blade assembly 255 is cable flown and is aerodynamically controllable by means of one or more blade elevators so as to vary the stable angle of attack at which the blade assembly meets the air. As here preferably embodied, each blade assembly 255 (Fig. 10) comprises a blade member 256 which is preferably of symmetrical airfoil section, and a pair of supplementary elevator structures 257 for aerodynamically controlling the stable angle of attack at which the blade assembly meets the air and for imparting the necessary "twist" to the blade as a propeller. It should be noted that Fig. 10 is a view of the underside of one such blade assembly as it would appear in helicopter flight as viewed from the ground.

Each blade member 256 is preferably so constructed as to have sufficient uniform torsional flexibility to permit the elevator structures 257 to impart "twist" to the blade member in flight. To this end, the blade member as embodied is of tubular single spar and rib construction providing a torsionally flexible framework upon which covering material of wood veneer or thin metal is fastened. The covering material may be applied in layers so as to provide a surface of increasing thickness from tip to root of the blade member, or it may be a single layer tapering in thickness from root to tip. Preferably, however, and as here embodied, the blade member 256 is provided with chordwise slots 256a adjacent its leading and trailing edges between the elevator structures 257.

It is known that the purpose of blade twist in both conventional propellers and helicopter rotors is to obtain an approximately constant angle of attack from the root of the blade to the tip. With the present invention, the nose rotor functions both as a propeller and as a rotor. In the "propeller" condition, the ratio V/ND is high and approximates unity. Considering the blade elements from root to tip, the V/ND of each element varies progressively, starting at a high value, because the peripheral velocity of the root element is low, and diminishes to a minimum value at the tip where the peripheral velocity is maximum. In the embodiment of Fig. 1 where the nose rotor is of smaller diameter than the tail rotor and has a higher rotational speed, the outboard tip speed of the nose rotor may be more than double the inboard tip speed. In such case, the V/ND may well vary over 100% and considerable "twist" is necessary if each blade element is to meet the air at the same stable angle of attack. Moreover, since the nose rotor functions both in the propeller condition and in the helicopter condition with slip stream reversed, the total required twist varies from a considerable twist angle, for example 30°, through zero twist (where the elements lie in one plane) to a negative twist of 4° or 5°. The tail rotor 6 situation is much simpler since it only functions in helicopter flight where the necessary twist may be small in amount and fixed, that is, built in, because there is no need for changing it to cover a wide range of V/ND.

Referring now to Fig. 10, it will be observed that the elevator structures 257 are located adjacent the inboard and outboard tips of the blade member 256 and each has an adjustable elevator member, or blade elevator 259 hinged to a fixed stabilizer member 258.

Considering a helicopter flight condition where inflow is from tail to nose and angle of attack of each blade element is relatively high, e. g., around 10°, the changing V/ND from root to tip requires that the outboard and inboard blade elevators 259 be initially set in predetermined opposite angular relation to each other so that as each blade assembly 255 rotates, its blade member 256 will have a "twist" imparted thereto correct in magnitude and direction to establish substantially the same angle of attack throughout the blade length. Thus, the outboard blade elevator 259, Fig. 10, will be set so as to decrease the angle of attack at the tip in helicopter ascent and the inboard blade elevator will be set oppositely so as to resist turning of the blade member 256 as a unit while permitting the blade member to "twist" in the right direction in consequence of the built in torsional flexibility. Obviously the setting which will impart "twist" in one direction to a blade member in helicopter flight will impart an opposite twist as in airplane flight where the slip stream is reversed.

Each elevator structure 257 is preferably of symmetrical airfoil section and is supported in fixed following relation to its blade member 256 upon and by a hollow outrigger 260 which encloses a link connecting the underside of the blade elevator 259 (as viewed in helicopter flight) to suitable means within the blade member 256 for angularly adjusting the blade elevator in flight. It will be noted that the link arrangement of the nose rotor is the reverse of that of the tail rotor 6 in that the operating link in the latter case is connected to the top side of the tail rotor elevator member or blade elevator 57.

Each blade member 255 terminates at its inboard in a hollow spar 261 of streamlined contour which functions to support the blade assembly from the hub 250 when at rest and to fair the flight cable 262 and control cable 263 of the blade assembly in flight.

It is to be understood of course that other forms of blade assemblies may be employed, such as, for example, those shown in Figs. 11A and 11C, suitably modified to impart thereto the necessary "twist."

Adjustment of each blade elevator member 259 in flight is preferably accomplished through the provision of centrifugally responsive control means, one for each blade elevator, located within the blade member, such means being diagrammatically indicated in Fig. 10, and similar in most respects to that shown in Fig. 13. Connection of the control cable 263 thereto and anchoring of the flight cable 262 to the blade member 256 is preferably in accordance with the teachings of Fig. 13 and the descriptive matter with reference thereto.

Means are provided for flexibly connecting the blade assemblies 255 to the rotor hub 250 so that they will be supported thereby in extended position and in cantilever fashion when at rest and still be cable flown so as to be subjected to only one degree of restraint in flight.

As here embodied and as best shown in Figs. 24 to 27, inclusive, the rotor hub 250 is provided with a plurality of lugs 264, one for each blade assembly. A sheave bracket 265 is hingedly connected to each lug 264 by a hinge pin 266 and each bracket carries a pair of side-by-side sheaves 267 and 268 mounted for rotation upon a hinge pin 269.

The sheave brackets 265, respectively, comprise a pair of spaced parallel arms 270 and 271 joined at their inboard extremities and terminating there in ears 272 and 273 by which each sheave bracket is journalled on its hinge pin 266.

Arms 274 and 275 extend from the rotor hub 250 at either side of each of the respective lugs 264 and in outwardly diverging relation to each other. These function to limit the angular movement of the sheave bracket 265 about its pivot axis. Cushioning and/or damping means, not shown, may be interposed between bracket 265 and arms 274 and 275. The divergence of the arms 274 and 275 is sufficient to permit the sheaves 267 and 268 and their supporting bracket 265 to assume whatever coning angle the nose rotor 5 requires for proper operation in flight. The arms 274 function also to support the sheave brackets 265 (and hence the blade assemblies 255) when the nose rotor is at rest and the aircraft is in a ground position as shown in Fig. 1.

A tubular spar socket member 277 is journalled by a pair of arms 278 and 279 on each of the pins 269. Bearing members 280 and 281, of suitable anti-friction material, are positioned within each socket member 277 at either end thereof and facilitate rotary movement of the spar 261 of which the inboard end is lodged in the socket.

Each of the blade assemblies 255 is freely flown from the rotor head 250 by means of a flight cable 262 which runs over one of the sheaves 268 and is firmly anchored at its outboard end to the internal structure of its blade member, as in Fig. 13. Its inboard end is securely anchored and dead ended to the rotor head 250 the latter being apertured as at 284 (Fig. 26) to permit the passage of the cable therethrough.

The blade elevator members 259 are adapted to be actuated by means of their control cables 263. Each of the cables 263 runs over a sheave 267 and is anchored at its inboard end to a sheave crank 286 mounted for rotary movement on a shaft 287 carried by the rotor head. The sheave cranks 286 are in all respects similar in structure, arrangement, mounting and function, to the sheave cranks 84 of the tail rotor 6.

The sheave cranks 286 are each angularly adjustable by means of a push rod 288, one to each sheave crank, the push rods being, respectively, slidably mounted in the web of the sprocket gear 27 forming the rear end wall of rotor head 250 so that axial in and out movement of a push rod will effect a desired angular movement of its sheave crank, the movement being transmitted via the control cable 263 to the blade elevator member operated thereby.

Each of the push rods 288 has its forward end in engagement with an arm of the sheave crank which it actuates and has its other end removably lodged in a suitable slotted radial socket 290 in a rotatable annulus 289 of the nose rotor push rod carrier 292. (See Fig. 27.)

The rotatable annulus 289 is analogous in structure and function to the rotatable annulus 243 of the tail rotor. As here embodied, the annulus 289 is journalled for rotation with the rotor hub 250 by suitable anti-friction bearings 289a, upon a rotatably fixed annulus 291. (See Fig. 27.)

The rotatably fixed annulus or rim 291 is mounted for movement axially and/or angularly of the axle member 8 so as to effect either differential and/or simultaneous in or out axial movement of the push rods 288 and, in consequence, simultaneous and/or differential actuation of the blade elevator members 259 in either direction. As here embodied the annulus 291 is connected by a series of radially extending spokes 293, four in number, each fixedly secured to the ring 291 at one end and removably secured to one arm of a spider hub member 295 at the other end. Each spoke 293 traverses one of a number of longitudinal slots 294 in the axle member 8 which are suitably dimensioned to permit the desired axial and angular movement of the push rod carrier 292.

The spider member 295 is universally mounted within the axle member 8 so as to permit angular as well as axial adjustment thereof, thereby providing for differential as well as simultaneous adjustment of the blade elevators 259. As here embodied, the spider member 295 is provided with a central hollow hub from which extends rearwardly a lever member 296 from which sets of cables 297 and 298 lead to the pilot's control column 14, the cables being secured in any suitable fashion, as by eyelets 299. Extending forwardly from the spider 295 is the male member 300 of a ball and socket type universal joint, which is lodged in the splined head of a suitably recessed high pitch, right hand multiple threaded bolt 301.

A removable lock ring 303 couples the bolt 301 and member 300 to each other, the lock ring being suitably spherically contoured to coact with the member 300 and permit relative rotation of the joint elements.

The bolt shank is threadedly engaged by a coaxial sheave nut 304 mounted in suitable anti-friction bearings for rotation in a sheave frame 307 secured to the axle member 8 so that relative rotation of the sheave nut 304 and bolt 301 will effect axial movement of the bolt and, in consequence, of the spider member 292. The sheave nut 304 is traversed by the endless cable 249 which, as has been described previously, also traverses sheave nut 179 of the tail rotor. Sheaves 310 and 311 supported by the sheave frame at one side of the axis of the sheave nut 304 are provided for guiding the cable 249 in its traverse of the sheave nut.

The splined head of the bolt 301 is slidably lodged in an axially aligned and axially fixed sheave 312 for rotation therewith, the bore of the sheave being splined to coact with the splined head of the bolt and permit relative axial movement of the sheave 312 and bolt 301.

The sheave 312, journalled in the sheave frame 307 upon suitable anti-friction bearings, is adapted to be rotated by means of an endless cable 315 which traverses the sheave 312 and is guided in its traverse by parallel, co-axial idler pulleys 316 and 317 journalled in the sheave frame 307. One flight of the cable 315 is connected to the control column 14 by which it is adapted to be moved in either direction by suitable movement of the control column 14 so as to produce clockwise or counter-clockwise rotation of the sheave 312.

A preferred form of control system for actuating the blade elevators and the tail rotor expansion-retraction mechanism is depicted diagrammatically in Fig. 28. Dual control columns 14 are depicted which are identical in structure and function so that a description of one and of its modus operandi will be understood to be equally applicable to the other.

Each control column 14 is journalled for limited rotary movement upon a stud 320 and is provided with a forwardly extending arm 320a to which is secured one flight of the endless cable 315. Thus, assuming a helicopter attitude as in Fig. 1, tail rotor expanded, clockwise rotation of the column from the neutral position (as viewed from the pilot's seat looking toward the nose) will effect clockwise rotation of the sheave 312 and bolt 301 of the nose rotor so as to move the bolt 301 axially forward in the sheave nut 304. This axial movement is transmitted through the push rod carrier 292 to push rods 288 so as to rotate the sheave cranks 286 (Fig. 26) of the nose rotor counter-clockwise (as viewed in Fig. 26) and draw in on the blade elevator control cables 263 thereby depressing (i. e., pushing downward as viewed in Fig. 1) all of the blade elevators 259 of the nose rotor equally (Fig. 10) and decreasing the stable angle of attack of each nose rotor blade assembly the same desired amount. Restoration of the blade elevators to the neutral position is effected by restoring the control column to its neutral position and thereby permitting the centrifugal force acting on the blade elevator control cables and control mechanism during rotation (Fig. 13) to restore the blade elevators and sheave cranks to their neutral position. Counter-clockwise rotation of the control column 14 from the neutral position will produce an increase in the stable angle of attack of the front rotor assemblies by effecting rearward movement of the push rod carrier, thereby permitting the sheave cranks 286 to move clockwise as viewed in Fig. 26 under the pull exerted on elevator control cables 263 by centrifugal force.

It will be understood that the blade elevator push rod of each nose rotor blade assembly is on the underside of the blade assembly as viewed from the ground in helicopter flight. Hence, pulling in one the blade elevator control cable will move the blade elevator downward, that is, toward the ground, the couple thereby produced tending to rotate the blade assembly about its spanwise axis through its center-of-gravity to a new lower angle of attack at which the total thrust and torque developed by the nose rotor will be less. Paying out on the elevator control cables will obviously have the opposite effect. Thus, considering the aircraft in helicopter flight, tail rotor expanded, in the attitude of Fig. 1, the fuselage may be revolved slowly about its longitudinal axis in either direction so as to permit the pilot to scan the whole horizon, by rotating the control column 14 in one direction or the other so as to create an unbalanced torque condition between the nose and tail rotors. In airplane flight, tail rotor retracted, the torque of the nose rotor may be balanced in the usual conventional fashion by differential incidence of the fixed wings as will be apparent to those skilled in the art.

The stud 320 is pivotally mounted on a transverse shaft 321 for limited angular movement in the spanwise plane established by the intersecting axes of stud 320 and shaft 321. An arm 322 extends forwardly in this plane from the stud and has attached thereto a cable 323 which extends laterally therefrom in either direction over a pair of idler sheaves 324 and 325 and is coupled at either end to the cable 298 at opposite sides of the push rod carrier lever 296. Assume the aircraft to be in helicopter attitude as in Fig. 1, by swinging the control column 14 to the pilot's left, the movement will be transmitted by the cable 323 to the cable 298 which in turn swings the push rod carrier lever arm 296 of the front rotor to the left, that is, in the same direction. At the same time, push rod carrier lever 248 of the tail rotor is also moved by the cable 298 to the left, that is, in the same direction, the cable 298 being connected thereto and being crossed intermediate the nose and tail rotor levers to effect this result. As to the effect of this movement on the nose rotor, swinging of the lever 296 to the left will tilt the push rod carrier 292 to the left so as to effect a continuously variable axial movement of the push rods 288. In consequence of this movement, the blade elevators of the nose rotor will be caused continuously to change their stable angle of attack as the blade assemblies rotate so that during a part of each revolution of the nose rotor each blade assembly will produce a greater thrust or lift force, as the case may be, than it will during the remainder of the revolution. This is tantamount to tilting of the nose rotor axis so that the vector $V_N$ of resultant force of the nose rotor no longer lies along the axis of rotation, but is angularly displaced so as to pass to one side of the center-of-gravity of the aircraft, this condition being depicted in Fig. 31. A couple is thereby produced which, in the vertical attitude of the aircraft during ascent (the condition depicted in Fig. 31) and with the center of gravity lying between the nose and tail rotors, would produce counter-clockwise motion of the aircraft about its center of gravity, as viewed in Fig. 31, operating to cause the aircraft to follow an upward backward path curving to the pilot's right. This is assuming that the pilot is facing forward and his "right" remains unchanged. In airplane flight this control setting would produce a clockwise yawing moment as viewed in plan.

The tail rotor produces a supplementary angularly displaced vector $V_T$ of the resultant force engendering a couple acting in the same direction, as is depicted in Fig. 31. Obviously, the magnitude and direction of the couple produced by the combined action of the nose and tail rotors may be varied by suitable manipulation of the control column 14 in either direction from the neutral position. It is understood of course that in airplane flight the tail rotor will normally be retracted with its blade elevators immobilized so that the yawing moment in this flight condition will be furnished by the nose rotor only.

A pitching moment in airplane flight (corresponding to a rotational movement about the spanwise horizontal axis through the center-of-gravity of the aircraft in helicopter flight) is obtainable by angular adjustment of the control column 14 in a vertical plane, that is, by tilting the column 14 up or down in airplane flight from the neutral position shown in Fig. 28. The necessary continuously varying angle of attack of the blade assemblies of the nose rotor in airplane flight (and of both the nose rotor and tail rotor in helicopter flight) is obtained by tilting of the lever arms 296 and 248 in the longitudinal vertical plane of symmetry of the aircraft. To this end, the shaft 321 is journalled in bearings 325 and 326 and carries a sheave 327 over which is wrapped the cable 297 by which the nose and tail rotor levers 296 and 248, respectively, are connected for simultaneous operation and by which they are adapted to be tilted in the vertical plane. Thus, by tilting the control column 14 upward in airplane flight, the shaft 321 and sheave 327 will be rotated and the motion transmitted via cable 297 to the levers 296 and 248 which will be tilted upwardly equal distances. The cable 297 is crossed intermediate the levers 296 and sheave 327 to effect this desired result. The push rod carrier 292 of the nose rotor and push rod carrier 164 of the tail rotor will thereby be tilted correspondingly so as to continuously vary the setting of the blade elevators. Thus, as the nose rotor 5, for example, rotates during airplane flight, each blade assembly 255 will attain its maximum angle of attack and develop its maximum lifting force as it reaches its top position in flight at which time the other blade assemblies will be developing a lesser lifting force. The resultant lifting force will be angularly related to the transverse rotational axis of the aircraft so that a pitching moment tending to depress the nose of the aircraft will ensue. In helicopter flight, this pitching moment will be supplemented by that generated by the tail rotor, the relationship of the vectors of lifting force and of the couples about the center of gravity of the aircraft in helicopter flight being the same as is depicted in Fig. 31 save that they will act in a plane at 90° to that there shown. Obviously, tilting of the control column 14 in the opposite direction will produce a corresponding effect in the opposite sense.

Provision is made for compensating for the inertia-lag of the blade assemblies in responding to a change in the setting of the blade elevators. As here embodied, the control cables 297 and 298 for continuously variable angle of attack control are given a lead in the amount of angle Y corresponding to the angular amount of the inertia-lag. This is desirable since an instantaneous change of angle of attack of one of the blade assemblies does not produce instantaneously a moment in a plane passing through the axis of rotation and the blade center-of-pressure (C. P.). The effect is that the instantaneous change in angle of attack brings about an increase or decrease in the aerodynamic lift force acting on the blade and this brings about a change in the coning angle of the blade in question in a measurable interval of time. Since the total resultant vector of a multi-blade rotor depends upon the instantaneous coning angles of each of the blades, it follows that to produce a moment only in say the true vertical longitudinal plane in airplane flight, the change of angle of attack must occur at some instant earlier than the instant that the blade crosses the vertical longitudinal plane. Since the control system produces cyclical changes in angle of attack (plus on one side of the circle and minus on the other) and since it is not practical that the pilot should anticipate consciously any inertia-lag, it is desirable to give the controls a "lead" in the angular amount of the inertia-lag.

Referring to Fig. 28 wherein the tail rotor as represented by push rod annulus 243 revolves clockwise looking from front to rear of the aircraft, the system of control wires 297 and 298 treated as a unit is given a counter-clockwise lead in the amount of angle Y, for example, around 90°. Hence, if the control column 14 be tilted in a true longitudinal vertical plane for the purpose of producing a moment and consequent rotation in that plane, the cable 297 swings carrier lever 248 not in that true longitudinal plane, but in a plane rotated therefrom by the amount of Y against the sense of rotation of the tail rotor. Since Y compensates for the inertia lag, the swept rotor disc or "cone" itself will swing as desired in the true vertical longitudinal plane and produce the desired moment and rotation of the aircraft as a whole in that plane. Correspondingly, the nose rotor system of control wires 297 and 298 is advanced an amount Y counter-clockwise viewing the nose rotor from rear to front. Suitable sheaves 328 traversed by the cables 297 and 298 provide the necessary directive effect for the cables at the nose rotor and sheaves 329 perform a corresponding function for the tail rotor.

Referring now more particularly to Fig. 31 it will be observed that the center-of-gravity of the aircraft lies between the nose rotor and the tail rotor and nearer to the former than to the latter. Thus the nose rotor moment is slightly less than the tail rotor moment (both taken about the center of gravity). This relationship has proved to provide a satisfactory well damped stability, firstly because each rotor as previously explained has a pitching response to air flow transverse of the rotor and secondly because the net resulting moment is always in the right direction to overcome the disturbing effects of transverse air flow, i. e., gusts.

The pitching response follows from the employment of a free bladed rotor, (in the sense herein discussed, "free" means free to "flap" or rise and fall out of the plane of rotation as distinguished from "rigid" meaning constrained to revolve in the plane normal to the axis.)

Free bladed rotors have an inertia-lag angle in the order of 90° and it is this fact which imparts to them inherently stable properties not possessed by rigid propellers. Hence, if a free-bladed rotor as in an autogyro be subjected to transverse airflow, the 90° inertia-lag results in the moment effect being one of pitch, rather than one of roll as would be the case with a rigid propeller. Thus, with the free bladed rotor there is a stable correcting moment which takes place practically in line with the direction of air flow across the rotor disc.

Stability depends upon transverse air flow (the effect of gusts) to bring about a swinging of the generated cone axis in the desired direction to tilt the total vector to produce a corrective rotation of the machine as a whole. It is established that free-bladed autogyro rotors (always located above the center-of-gravity) possess stability in the correct plane and in the correct sense of direction. Thus, in the preferred embodiment of this invention, the tail rotor has a stabilizing influence in helicopter flight since it lies above the center-of-gravity and is free-bladed. The nose rotor has an unstabilizing influence since it lies below the center-of-gravity as shown best in Fig. 31. The net result is stabilizing, however, because the tail rotor moment exceeds the nose rotor moment. It will therefore be obvious to those skilled in the art that by suitably proportioning the magnitude of the respective rotor moments through proper positioning of the center of gravity the requisite stability may be obtained.

Referring now more particularly to Fig. 34, a diagrammatic representation of a rotor system is shown wherein the center-of-gravity of the aircraft lies below both rotors in helicopter flight. In this case, both rotors have corrective stability with the result that the net effect is considerably more powerful than in Fig. 31.

Control column 14, in airplane flight, may be swung as a "joy-stick" to produce pitch and yaw, the rule applying that the nose will follow the direction indicated by the position of the control column 14. Roll to the right or left is effected by turning the hand wheel secured to the head of the control column, clockwise rotation producing clockwise roll and vice versa.

Means are provided for manipulating the cable 249 so as to change the stable angle of attack of both the nose and tail rotor blade assemblies simultaneously. As here embodied, a simultaneous angle of attack lever 330 is pivotally mounted within reach of the pilot in a suitable bearing member (not shown) by means of a shaft 331 and has attached thereto the flights of the endless cable 249 in such fashion that by movement of the lever handle the cable flights will be moved in opposite directions so as to rotate the sheave nut 304 of the nose rotor and the sheave nut 179 of the tail rotor, simultaneously. Thus, in helicopter flight backward movement of the lever 286 from its neutral position will actuate the sheave cranks 286 of the nose rotor and the sheave cranks 84 of the tail rotor so as to pay out the elevator cables 263 of the nose rotor thereby elevating the blade elevators 259 to increase the angle of attack of the nose rotor blade assemblies 255; and so to pull in on the elevator control cables 63 of the tail rotor and thereby elevate the blade elevators 57 to increase the angle of attack of the tail rotor blade assemblies 40. Correspondingly, forward movement of the lever 330 will effect the opposite result. The lever 330 may be interconnected by suitable means (not shown) with the engine throttle or other speed control mechanism of the engine so that a fairly constant engine R. P. M. may be maintained in spite of large changes of torque load accompanying blade angle changes, resulting from either deliberate changes of angle of attack adjustment or changes of V/ND condition.

In the modification shown in Figs. 32 and 33, the aircraft as embodied is provided with oppositely rotating front and rear free bladed rotor systems 335 and 336, respectively, such as have heretofore been described, both situated above the center-of-gravity of the aircraft when in the helicopter attitude so that the relationship to the center of gravity of vectors $V_N$ and $V_T$ of resultant force of the nose and tail rotors, respectively, engendered by tilting the pilot's control column to his left, for example, would be as shown in Fig. 34.

The aircraft of Figs. 32 and 33 is divided into an aft compartment 339 and a forward cargo and passenger carrying compartment 337 which latter is provided with the necessary controls (not shown) for actuating the nose and tail rotor blade elevators. The forward compartment is hingedly connected, through a suitable hinge structure 338, with the after compartment 339 which latter accommodates the power plant for the rotor systems, the power transmission system and the retracting mechanism for the rear rotor system, much in the fashion of the preferred embodiment of Fig. 1.

Means are provided for angularly adjusting the forward and aft compartments 337 and 339, respectively, relatively to each other so as to permit conversion of the aircraft in flight from the helicopter attitude of Fig. 32 to the airplane flight attitude of Fig. 33, with a minimum of passenger discomfort. As here embodied, in Figs. 32 and 33, the compartments 337 and 339 are coupled by a telescopic strut 340 which is adapted to be extended and retracted by hydraulic, pneumatic or other suitable fluid pressure or mechanical means (not shown) to rotate the compartments with reference to each other from the position shown in Fig. 32 to the position shown in Fig. 33. By this construction, the compartment 337 need not be provided with trunnion seats since the occupants will remain in the same attitude relative to the ground during helicopter ascent and airplane flight. Conversion may be effected during the dive from hovering attitude as at II in Fig. 2 to the airplane flight attitude as at IV in the same figure. The hinge structure 338 lends itself readily to the coupling of the control cables interconnecting the necessary rotor control mechanism in the aft compartment with the pilot's control column (not shown) in the forward compartment. Such expedients will readily suggest themselves to those skilled in the art.

It is to be understood that manoeuvering of the aircraft of this invention is intended to be effected primarily by means of the directive effects capable of being set up by variation in the aerodynamic forces generated by the rotor systems, severally and/or collectively. The employment of conventional ailerons, elevators and/or rudders is not precluded thereby, however, since such devices may well be found useful to supplement the normal manoeuvering functions of the rotor systems, particularly in airplane flight. It is therefore apparent that the employment of such devices is contemplated herein and the embodied aircraft are accordingly preferably provided therewith and although the necessary cables for actuating such conventional systems are not shown it will be readily apparent that they may be coupled in any suitable and convenient manner to the control columns 14 and the usual rudder control mechanism (not shown) so as to operate in the usual fashion.

As illustrative of the preferred operation of this invention, as applied to the embodiment of Fig. 1, at take-off (position I, Fig. 2) both rotors are over-revved (tail rotor expanded) at a small angle of attack A, Fig. 29, to store surplus energy for excessive power required for jump take-off. At the instant of take-off, the pilot moves the lever 330 rearwardly, the air "inflow" being from tail to nose, to produce a blade angle of attack A of say about 10° which will produce rapid and sudden vertical ascent in the form of a "jump take off." As R. P. M. drops off due to the consumption of stored energy, rate of climb will correspondingly decrease. This will occur after an altitude of more than 80 ft. or 90 ft. for example has been obtained and obstacles at the edge of any very small landing area have been cleared. After this initial jump, except in machines of excessively low power loading, a good rate of climb cannot be maintained vertically with efficient use of power and, therefore, climbing on an inclined path in which the horizontal component of motion is in the order of 12 miles per hour, for example, becomes necessary for efficient rate of climb. The reason for this lies in the nature of the inflow wherein the sidewise component of motion feeds a large volume of air into the rotor that is not possessed of any vertical component, whereas, the larger portion of the volume entering the rotor under hovering conditions has a considerable downward velocity. The less the downward velocity V, Fig. 29, of all the air comprising the "inflow" the lower the blade angle B for a given angle of attack A on the blade and consequently the lower the torque Q and power required.

At the top of the helicopter climb, and going into the dive, lever 330 is moved to the opposite, that is, forward position which changes the angle of attack A on the blade assemblies from about 10° on one side, for example to about 1.5° on the other, for example, the air "inflow" being from nose to tail. Retraction of tail rotor 5 is initiated by forward movement of lever 237 and at the same time, engine R. P. M. is cut from a normal rate, of say 2000 R. P. M. for example, to say about 1000 R. P. M. for example. Retraction is effected in a few seconds, for example, about 5 seconds during which time the aircraft has gained considerable downward velocity vertically, for example, in excess of about 110 miles an hour and may be gradually pulled into horizontal flight.

During retraction, engine R. P. M. is increased by the pilot so that at the end of the retraction interval, tail rotor head R. P. M. is back to normal. The machine is then in normal airplane flight attitude and condition as at IV, Fig. 2, at a flight speed ranging from say 130 to 150 miles per hour, for example.

The retracted tail rotor 6 is idling in a feathered manner, substantially zero torque, and the nose rotor 5 is functioning as a propeller, its torque being now balanced by differential wing incidence and, if necessary, by aileron control. It will be observed that the pilot having set the blade assemblies for a 1.5° angle of attack, the actual blade angles B, Fig. 30, in airplane flight will then depend upon the V/ND condition, or since R. P. M. may be considered constant and diameter is constant, the nose rotor blade angle will then depend upon the flight speed V, Fig. 30.

In landing, the relatively high velocity of the aircraft in respect to the surrounding air in normal flight, 150 M. P. H. for example, represents a huge supply of available energy which may be put into the rotors at will. For instance, the expansion of the tail rotor occurring in horizontal flight at 150 M. P. H. may take from the passing air stream a very large amount of power and yield a braking force of great magnitude so as to reduce the forward velocity materially and quickly. The machine may then be nosed over and caused to descend at a controlled and moderate speed. With power available this descent may be arrested at will and the machine may climb back in helicopter manner, hovering or descending with power on or with auto-rotating rotors at any desired rate. After expanding the tail rotor the pilot uses angle of attack control lever 330 for controlling the rate of deceleration and may adapt the angle of attack for whatever purposes desired.

In landing, the operation is simple when no ground wind exists since even with a dead engine the rotors may always be over-revved by using a rapid descent with auto-rotating motors and the flywheel energy thereby stored in the rotors is available for hovering, for five or six seconds, preparatory to actual precision landing. But, if there is ground wind, the aircraft must glide with a horizontal component of motion substantially equal to the ground wind and this gliding or side-slipping in helicopter manner is easily effected by the ordinary use of the control column 14.

After landing, the tail rotor 6 must be retracted since otherwise it could not be stopped without the blade assemblies colliding, as they coned down, with the fixed wings 2. The nose rotor blade assemblies at rest are supported by the blade spars 261 upon the brackets 274 (Fig. 24). If the landing has been made without engine power, then as soon as the tail rotor has decelerated to say about 90 R. P. M., for example, it must at once be retracted. The rotor retracting mechanism as here embodied is really subject to semi-automatic control through operation of the retraction-expansion lever 237 (Fig. 28). Alternately, however, fully automatic retraction may be provided by utilization of suitable governing means such as a flyball governor so connected as to cause tail rotor retraction at a predetermined reduced speed. Push button control may then be used for expanding the rotor.

Referring now to Fig. 29 it will be seen that in helicopter flight at a given operating R. P. M., high lifting thrust is obtainable because both rotors are functioning, the blade assemblies being set for maximum lift, that is, at large angle-of-attack A. The angle-of-attack A is high for maximum lift (not maximum L/D though blade angle B is relatively low.) This corresponds to a low V/ND condition, which, though representing a low propeller efficiency, is controlling of the angle C which the lift force L makes with the thrust axis and is thus productive of a high axial lifting thrust T with a relatively low torque Q.

In airplane flight, Fig. 30, where high rotor blade L/D is also desired and the thrust requirement is relatively low, the angle of attack A may be made small although the blade angle B is large. At high flight speeds V is large and V/ND, as measured by the angle C, is correspondingly much larger than in helicopter flight since the engine R. P. M. is unchanged. Hence, the blade angle B is high, as is the angle C, which latter approximates 45°, the angle for most efficient propeller operation.

Thus it will be seen that the aircraft possesses the necessary aerodynamic efficiency and flexibility for both helicopter and airplane flight, it being understood that the vector diagrams of Figs. 29 and 30 represent typical theoretical aerodynamic and mechanical forces acting on the rotor systems of the same aircraft in the two flight conditions. Accordingly, in Figs. 29 and 30, corresponding vectors and angles may be compared for the purposes of determining relative magnitudes and directions in the two flight conditions.

The invention in its broader aspects is not limited to the specific steps, processes, combinations and mechanisms shown and/or described but departures may be made therefrom within the scope of the accompanying claims without departing from the principles of the invention and without sacrificing its chief advantages.

What I claim is:

1. An aircraft capable of helicopter and airplane flight including in combination a fuselage structure; landing-gear means at the nose of said fuselage; a fixed flight-sustaining member positioned rearwardly of said landing-gear means; a propelling-sustaining rotor intermediate said landing-gear and said fixed flight-sustaining member; a propelling-sustaining rotor of larger outside diameter positioned rearwardly of said sustaining member, said rotors being mounted for rotation at substantially constant but unequal angular velocities in opposite directions upon a common fixed axis constituting the air inflow axis of the aircraft in both helicopter and airplane flight said rotors being capable of developing a thrust in either direction of said axis and respectively comprising aerodynamically stable lift-producing structures, each having means for aerodynamically controlling the structure so as to vary the stable angle of attack at which the said structure meets the air, a rotor head, and cables connecting said structures to said rotor head so as to enable the said structures to meet the air at a stable (constant) angle of attack; means for driving said rotors in opposite directions at unequal angular velocities; unidirectional torque-transferring means interposed between said rotors and said driving means to enable auto-rotation of said rotors to occur under certain conditions of flight; and, means for retracting and expanding one of said rotors in flight.

2. In an aircraft, a retractable-expandible thrust-producing rotor comprising in combination, a rotor head, said head comprising a rotatably mounted threaded winding drum, a winding nut threadedly engaging said drum, means for effecting relative rotation of said drum and nut, and winding sheaves carried by said nut; a plurality of aerodynamic lift-producing structures revolvable about the rotational axis of said drum; and, cables for flying said structures from said rotor head, said cables traversing said winding sheaves whereby, as said nut is rotated relative to said winding drum, said cables will be wound in or unwound from the threads on said winding drum by said winding sheaves, thereby to retract or expand said lift-producing structures.

3. An aircraft capable of helicopter and airplane flight including in combination means for sustaining the aircraft in airplane flight; and, means for sustaining and propelling the aircraft in both helicopter and airplane flight, said sustaining-propelling means comprising a plurality of rotors mounted for rotation in opposite directions on a common fixed axis constituting the air inflow axis of the aircraft in both helicopter and airplane flight, said rotors respectively being capable of developing a thrust in either direction of said axis and comprising a plurality of aerodynamically stable lift-producing structures, each said structure comprising a blade member and an elevator member, said rotors further respectively comprising a rotatably mounted hub, a flight cable flexibly connecting each blade member to said hub, a control cable providing a connection between each elevator member and said hub and pilot controlled means carried by said hub and connected to said control cables for varying the effective length of the respective control cables, thereby to permit a desired angular adjustment of said elevator members.

4. An aircraft comprising in combination propellers in tandem of which the blades are flexibly connected to their respective propeller hubs; means for aerodynamically controlling said blades so as to vary the angle of attack at which each said blade meets the air, centrifugally responsive means carried by said blades for actuating said control means, pilot controlled means carried by the propeller hubs for actuating said centrifugally responsive means; and, means for retracting the blades of one of said propellers.

5. An aircraft comprising in combination a body, a pair of propellers in tandem spaced relation along said body, each said propeller comprising aerodynamic lift-producing structures each connected to its propeller hub by a light weight, highly flexible cable; prime mover means common to the pair for driving the respective propellers in opposite direction in torque-balanced relation; cantilever means for supporting the lift-producing structures of one of said propellers when at rest; and, means for retracting the lift-producing structures of the other propeller in flight.

6. An aircraft capable of both helicopter flight and high speed airplane flight, said aircraft having a substantially constant angular speed rotor system capable of developing a thrust in either direction of the thrust axis and comprising aerodynamically stable lift-producing structures arranged to meet the air at a stable angle of attack in rotation; means for changing the swept disc area of said rotor system from a maximum value for helicopter flight to a minimum value for airplane flight; and, means for aerodynamically controlling the angle of attack at which the blades of said system meet the air.

7. A helicopter airplane comprising a rotor system adapted to operate at substantially constant speed and torque (i. e., constant power), said system being capable of developing a thrust in either direction of the thrust axis and comprising aerodynamically stable lift-producing structures arranged to meet the air at a stable angle of attack in rotation; means for aerodynamically adjusting the mean effective angle-of-attack of the blades thereof so as to provide a relatively high thrust in a substantially vertical direction and at relatively low V/ND in helicopter flight and a relatively low thrust at relatively high V/ND in airplane flight; and, means for changing the effective swept disc area of said system from a relatively high value for helicopter flight to a relatively lower value for airplane flight, whereby full engine horsepower can be efficiently converted to thrust horsepower in both helicopter and airplane flight conditions.

8. An aircraft comprising in combination at least a pair of counter-rotating free-bladed propellers each capable of developing a thrust in either direction of its rotational axis and each comprising aerodynamically stable lift-producing structures arranged to meet the air at a stable angle of attack in rotation; means for driving said propellers at substantially constant angular velocities; means for changing the combined swept disc area of said propellers from a maximum to a minimum value, said propellers when the said swept disc area is maximum having substantially the same mean peripheral velocity; and, means for varying the angle of attack at which the blades of each propeller meet the air so that for any given V/ND condition in either direction of thrust the propeller blades may be set at an angle of attack to the air with resultant blade angle from the plane of rotation that the maximum horsepower of the driving means is efficiently absorbed.

9. An aircraft capable of both helicopter flight and high speed airplane flight comprising in combination at least a pair of coaxial counter-rotating free-bladed propellers of unequal diameter capable of developing a thrust in either direction of the propeller axis and each comprising aerodynamically stable lift-producing structures arranged to meet the air at a stable angle of attack in rotation; the swept disc area of the larger propeller normally lying outside of the swept disc area of the smaller propeller; means for driving said propellers at unequal but substantially constant angular velocities, said propellers when the swept disc area is maximum having substantially the same mean peripheral velocity; means for retracting the larger propeller so as to reduce the effective swept disc area of the combined propellers in high speed airplane flight; and means for varying the angle of attack at which the propeller blades meet the air so that for a given V/ND condition in either direction of thrust the propeller blades may be set at an angle of attack at which the maximum horsepower of the driving means can be efficiently absorbed.

10. An aircraft comprising in combination at least a pair of coaxial counter-rotating free-bladed propellers capable of developing a thrust in either direction of the propeller axis, said propellers being located at either side of the center-of-gravity of the aircraft with said center-of-gravity located at approximately one third the distance from one propeller to the other; and, a fixed wing located between said propellers with its center-of-pressure substantially coincident with said center-of-gravity.

11. In an aircraft rotor, the combination with a blade member of aerodynamic control means, said member and means together forming an aerodynamically stable lift-producing structure, said control means comprising a blade elevator at either end of said blade member, said elevators being angularly related to each other so as to impart a "twist" to said blade member in its flight path sufficient to impart a substantially uniform angle of attack to said blade member throughout its span; and, pilot operated means for angularly adjusting said blade elevators simultaneously so as to vary the stable angle of attack at which said blade assembly meets the air.

SAMUEL DAVIS ROBINS.

REFERENCES CITED

The following references are of record in the file of this patent:

UNITED STATES PATENTS

| Number | Name | Date |
|---|---|---|
| 1,179,298 | Garretson | Apr. 11, 1916 |
| 1,181,784 | McCurry | May 2, 1916 |
| 1,546,443 | Glessner | July 21, 1925 |
| 1,697,009 | Isacco | Jan. 1, 1929 |
| 1,813,852 | Isacco | July 7, 1931 |
| 1,817,074 | Glessner | Aug. 4, 1931 |
| 1,909,450 | Bleecker | May 16, 1933 |
| 1,934,399 | Bleecker | Nov. 7, 1933 |
| 1,942,888 | West | Jan. 9, 1934 |
| 1,960,141 | D'Ascanio | May 22, 1934 |
| 2,043,704 | McPherren | June 9, 1936 |
| 2,163,481 | Cameron | June 20, 1939 |
| 2,226,978 | Pescara | Dec. 31, 1940 |
| 2,300,268 | Stuart | Oct. 27, 1942 |
| 2,308,802 | Barling | Jan. 19, 1943 |
| 2,328,786 | Crowder | Sept. 7, 1943 |